United States Patent
Li et al.

(10) Patent No.: US 11,468,300 B2
(45) Date of Patent: Oct. 11, 2022

(54) CIRCUIT STRUCTURE AND DRIVING METHOD THEREOF, NEURAL NETWORK

(71) Applicant: Tsinghua University, Beijing (CN)

(72) Inventors: Xinyi Li, Beijing (CN); Huaqiang Wu, Beijing (CN); Sen Song, Beijing (CN); Qingtian Zhang, Beijing (CN); Bin Gao, Beijing (CN); He Qian, Beijing (CN)

(73) Assignee: Tsinghua University, Beijing (CN)

( * ) Notice: Subject to any disclaimer, the term of this patent is extended or adjusted under 35 U.S.C. 154(b) by 178 days.

(21) Appl. No.: 16/071,985

(22) PCT Filed: Nov. 14, 2017

(86) PCT No.: PCT/CN2017/110871
§ 371 (c)(1),
(2) Date: Jul. 23, 2018

(87) PCT Pub. No.: WO2018/205533
PCT Pub. Date: Nov. 15, 2018

(65) Prior Publication Data
US 2021/0174173 A1   Jun. 10, 2021

(30) Foreign Application Priority Data

May 9, 2017 (CN) .......................... 201710322907.3

(51) Int. Cl.
*G06N 3/063* (2006.01)
*G06N 3/04* (2006.01)

(52) U.S. Cl.
CPC .............. *G06N 3/063* (2013.01); *G06N 3/04* (2013.01)

(58) Field of Classification Search
CPC .. G06N 3/04; G06N 3/02; G06N 3/06; G06N 3/049; G06N 3/08; G06N 3/084;
(Continued)

(56) References Cited

U.S. PATENT DOCUMENTS

2009/0135546 A1* 5/2009 Wang ................... H01G 4/1227
427/79
2012/0284218 A1* 11/2012 Kang ..................... G06N 3/063
706/28
(Continued)

FOREIGN PATENT DOCUMENTS

CN   103078054 A   5/2013
CN   103246904 A   8/2013
(Continued)

OTHER PUBLICATIONS

Yu, Shimeng, et al. "A neuromorphic visual system using RRAM synaptic devices with sub-pJ energy and tolerance to variability: Experimental characterization and large-scale modeling." 2012 International Electron Devices Meeting. IEEE, 2012: 10.4.1-10.4.4 (Year: 2012).*

(Continued)

*Primary Examiner* — Kamran Afshar
*Assistant Examiner* — Randall K. Baldwin
(74) *Attorney, Agent, or Firm* — Fish & Richardson P.C.

(57) ABSTRACT

A circuit structure and a driving method thereof, a neural network are disclosed. The circuit structure includes at least one circuit unit, each circuit unit includes a first group of resistive switching devices and a second group of resistive switching devices, the first group of resistive switching devices includes a resistance gradual-change device, the second group of resistive switching devices includes a resistance abrupt-change device, the first group of resistive switching devices and the second group of resistive switching devices are connected in series, in a case that no voltage is applied, a resistance value of the first group of resistive switching devices is larger than a resistance value of the second group of resistive switching devices.

17 Claims, 12 Drawing Sheets

(58) Field of Classification Search
CPC ...... G06N 3/063; G06N 3/0635; G11C 11/54; G11C 13/0007; G06K 19/00
See application file for complete search history.

(56) References Cited

U.S. PATENT DOCUMENTS

| | | | | |
|---|---|---|---|---|
| 2013/0033922 | A1* | 2/2013 | Kang | G11C 13/0069 257/E45.001 |
| 2013/0132314 | A1* | 5/2013 | Snider | G06N 3/063 706/15 |
| 2014/0310217 | A1* | 10/2014 | Sarah | G06N 3/063 706/15 |
| 2015/0171095 | A1* | 6/2015 | Wang | H01L 27/2463 365/185.18 |
| 2015/0269483 | A1* | 9/2015 | Nishitani | G06N 3/084 706/25 |
| 2015/0325790 | A1* | 11/2015 | Wu | H01L 45/1233 438/382 |
| 2016/0072062 | A1* | 3/2016 | Wu | H01L 45/08 257/4 |
| 2016/0110644 | A1* | 4/2016 | Huang | G06N 3/049 706/25 |
| 2017/0109628 | A1* | 4/2017 | Gokmen | G06N 3/0472 |
| 2017/0243109 | A1* | 8/2017 | Hu | G06N 3/0635 |
| 2018/0005115 | A1* | 1/2018 | Gokmen | G06N 3/084 |

FOREIGN PATENT DOCUMENTS

| | | |
|---|---|---|
| CN | 104376362 A | 2/2015 |
| CN | 105976022 A | 9/2016 |
| CN | 107122828 A | 9/2017 |

OTHER PUBLICATIONS

Wu, Huaqiang, et al. "Resistive Switching Performance Improvement of Ta2O5-x/TaOy Bilayer ReRAM Devices by Inserting AlO Barrier Layer." IEEE electron device letters 35.1 (2013): 39-41. (Year: 2013).*

Gao, Bin, et al. "Ultra-low-energy three-dimensional oxide-based electronic synapses for implementation of robust high-accuracy neuromorphic computation systems." ACS nano 8.7 (2014): 6998-7004. (Year: 2014).*

Li, Xinyi, et al. "Short time high-resistance state instability of TaOx-based RRAM devices." IEEE Electron Device Letters 38.1 (2016) : 32-35. (Year: 2016).*

Li, Xinyi, et al. "Electrode-induced digital-to-analog resistive switching in TaO x-based RRAM devices." Nanotechnology 27.30 (2016): 305201: 1-6. (Year: 2016).*

Gokmen, Tayfun, and Yurii Vlasov. "Acceleration of deep neural network training with resistive cross-point devices: Design considerations." Frontiers in neuroscience 10 (2016): 333: 1-13. (Year: 2016).*

Xu, Jianlong, et al. "Scaling-down characteristics of nanoscale diamond-like carbon based resistive switching memories." Carbon 75 (2014): 255-261. (Year: 2014).*

Zhang, Zhiping, et al. "All-metal-nitride RRAM devices." IEEE Electron Device Letters 36.1 (2014): 29-31. (Year: 2014).*

Seok, Junyeong "Simulation Study of Self-organization in Neural Network by Spike-timing Dependent Plasticity" Diss. 2015: i-172 (Year: 2015).*

Song, Lin, et al. "An efficient method for evaluating RRAM crossbar array performance." Solid-State Electronics 120 (2016): 32-40. (Year: 2016).*

Ye, Cong, et al. "Boosting the performance of resistive switching memory with a transparent ITO electrode using supercritical fluid nitridation." RSC advances 7.19 (Jan. 2017): 11585-11590. (Year: 2017).*

Chen, Po-Hsun, et al. "Resistance switching characteristics induced by O2 plasma treatment of an indium tin oxide film for use as an insulator in resistive random access memory." ACS Applied Materials & Interfaces 9.3 (Jan. 2017): 3149-3155. (Year: 2017).*

Li, Xinyi, et al. "Electrode-induced digital-to-analog resistive switching in TaOx-based RRAM devices." Nanotechnology 27.30 (2016): 305201. (Year: 2016).*

* cited by examiner

CIRCUIT STRUCTURE AND DRIVING METHOD THEREOF, NEURAL NETWORK

CROSS-REFERENCE TO RELATED APPLICATIONS

This application is a U.S. National Stage Application under 35 USC 371 of International Application No. PCT/CN2017/110871, filed on Nov. 14, 2017, which claims priority to Chinese patent application No. 201710322907.3, filed on May 9, 2017, the entire disclosures of which are incorporated herein by reference.

TECHNICAL FIELD

Embodiments of the present disclosure relate to a circuit structure and a driving method thereof, a neural network.

BACKGROUND

With rapid development of information technology, increase of an operation speed and reduction of energy consumption have become the bottleneck of development of a traditional von Neumann computing architecture. Currently, a brain-like computing system is considered to be a breakthrough direction in research for high-performance computers due to its characteristics such as large-scale parallel operation, low energy consumption, autonomous learning and self-adaption. In a human brain, neurons and synapses are the most important neural units and have the largest number. Therefore, building the brain-like computing system requires a large number of neuron-like electronic devices and a large number of synaptic-like electronic devices. These electronic devices not only need to mimic functions of neurons and synapses, but also need to have performances such as small areas, low power consumption, and high speed.

Currently, in the brain-like computing system, functions of the neuron-like need to be implemented through circuits. Due to the limitation upon hardware resources, the neuron-like electronic devices have defects of high energy consumption and inability to handle complex tasks, limiting the development of the brain-like computing system.

SUMMARY

At least one embodiment of the present disclosure provides a circuit structure and a driving method thereof, and a neural network. The circuit structure utilizes a resistance gradual-change device and a resistance abrupt-change device connected in series to form a neuron-like structure, so as to mimic functions, such as calculation, integrate-and-fire, attenuation, and filtering, of human brain neurons. For example, a resistance value of a resistance gradual-change device changes slowly under an external applied voltage, and the resistance gradual-change device can be used to mimic a behavior of an S-shaped growth curve of a biological dendrite. The circuit structure has advantages such as simple structure, low power consumption, a small area, ability to implement complex functions, and easy compatibility with standard CMOS manufacturing process.

At least one embodiment of the present disclosure provides a circuit structure, which comprises: at least one circuit unit, each circuit unit comprises a first group of resistive switching devices and a second group of resistive switching devices, the first group of resistive switching devices comprises a resistance gradual-change device, the second group of resistive switching devices comprises a resistance abrupt-change device, the first group of resistive switching devices and the second group of resistive switching devices are connected in series, in a case that no voltage is applied, a resistance value of the first group of resistive switching devices is larger than a resistance value of the second group of resistive switching devices.

For example, in the circuit structure provided by at least one embodiment of the present disclosure, the resistance gradual-change device has a first resistance value, the resistance abrupt-change device has a second resistance value, in the case that no voltage is applied, a range of the first resistance value is 1-100 megohms, and a range of the second resistance value is 1-1000 kilohms.

For example, in the circuit structure provided by at least one embodiment of the present disclosure, the resistance gradual-change device comprises a first oxide layer and a second oxide layer, which are laminated together, and an oxygen content of the first oxide layer is higher than an oxygen content of the second oxide layer.

For example, in the circuit structure provided by at least one embodiment of the present disclosure, a material of the first oxide layer is tantalum pentoxide or aluminum oxide, and a material of the second oxide layer is tantalum dioxide.

For example, in the circuit structure provided by at least one embodiment of the present disclosure, the resistance gradual-change device further comprises a first electrode layer and a second electrode layer, the first oxide layer and the second oxide layer are disposed between the first electrode layer and the second electrode layer, the first electrode layer is electrically connected with the first oxide layer, and the second electrode layer is electrically connected with the second oxide layer.

For example, in the circuit structure provided by at least one embodiment of the present disclosure, a material of the first electrode layer is active metal.

For example, in the circuit structure provided by at least one embodiment of the present disclosure, the active metal is aluminum, nickel, or titanium.

For example, in the circuit structure provided by at least one embodiment of the present disclosure, the resistance abrupt-change device comprises a third electrode layer, a third oxide layer and a fourth electrode layer, which are laminated together, and the third oxide layer is disposed between the third electrode layer and the fourth electrode layer.

For example, in the circuit structure provided by at least one embodiment of the present disclosure, a material of the third oxide layer is tantalum pentoxide, vanadium oxide, or niobium oxide.

For example, in the circuit structure provided by at least one embodiment of the present disclosure, a material of the third electrode layer is inert metal.

For example, in the circuit structure provided by at least one embodiment of the present disclosure, the inert metal is platinum, ruthenium, iridium, or palladium.

For example, in the circuit structure provided by at least one embodiment of the present disclosure, the first group of resistive switching devices comprises a plurality of resistance gradual-change devices, the second group of resistive switching devices comprises a plurality of resistance abrupt-change devices, and the plurality of resistance gradual-change devices are respectively connected in series with the plurality of resistance abrupt-change devices.

For example, in the circuit structure provided by at least one embodiment of the present disclosure, the first group of resistive switching devices comprises a plurality of resistance gradual-change devices, the second group of resistive switching devices comprises one resistance abrupt-change device, the plurality of resistance gradual-change devices correspond to the one resistance abrupt-change device and are respectively connected in series with the one resistance abrupt-change device.

For example, in the circuit structure provided by at least one embodiment of the present disclosure, in the case that no voltage is applied, resistance values of at least two resistance gradual-change devices are different.

For example, in the circuit structure provided by at least one embodiment of the present disclosure, at least two resistance gradual-change devices are connected in parallel.

For example, in the circuit structure provided by at least one embodiment of the present disclosure, the first group of resistive switching devices comprises one resistance gradual-change device, the second group of resistive switching devices comprises a plurality of resistance abrupt-change devices, and the one resistance gradual-change device corresponds to the plurality of resistance abrupt-change devices and is connected in series with the plurality of resistance abrupt-change devices in one-to-one correspondence.

For example, in the circuit structure provided by at least one embodiment of the present disclosure, threshold voltages of at least two resistance abrupt-change devices are different.

For example, in the circuit structure provided by at least one embodiment of the present disclosure, at least two resistance abrupt-change devices are connected in parallel.

At least one embodiment of the present disclosure provides a neural network, which comprises: a neuron unit. The neuron unit comprises the circuit structure described in any of the above embodiments.

For example, in the neural network provided by at least one embodiment of the present disclosure, the neuron unit further comprises at least one signal line. The signal line is electrically connected with one of the first group of resistive switching devices and the second group of resistive switching devices.

For example, in the neural network provided by at least one embodiment of the present disclosure, a signal line is correspondingly electrically connected with a resistance gradual-change device of the first group of resistive switching devices or a resistance abrupt-change device of the second group of resistive switching devices.

For example, the neural network provided by at least one embodiment of the present disclosure, further comprises a driver. The driver is configured to apply a voltage signal to a circuit unit through a signal line.

For example, in the neural network provided by at least one embodiment of the present disclosure, the voltage signal is a positive voltage signal.

For example, the neural network provided by at least one embodiment of the present disclosure, further comprises a synapse unit. The synapse unit comprises a third group of resistive switching devices, and the third group of resistive switching devices comprises a memristor.

At least one embodiment of the present disclosure further provides a driving method of the circuit structure described in any one of the above embodiments. The driving method comprises: applying a voltage signal to a circuit unit through a signal line to change a resistance value of the first group of resistive switching devices, so as to perform signal integration; and sending a signal when a resistance value of the second group of resistive switching devices abruptly changes.

For example, the driving method provided by an embodiment of the present disclosure, further comprises: after the resistance value of the second group of resistive switching devices abruptly changes, turning off the voltage signal to restore the resistance value of the first group of resistive switching devices and the resistance value of the second group of resistive switching devices to an initial state, so as to attenuate the signal.

For example, in the driving method provided by an embodiment of the present disclosure, the voltage signal is a positive voltage signal, and a voltage value of the voltage signal remains unchanged or the voltage value of the voltage signal gradually increases.

For example, the driving method provided by an embodiment of the present disclosure, further comprises: applying the voltage signal to the circuit unit through the signal line, and transmitting the signal when the voltage signal is greater than a threshold voltage of the first group of resistive switching devices.

It should be understood that the above general description of the present disclosure and the following detailed description are both illustrative and explanatory, and are intended to further illustrate the present disclosure.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to make following descriptions of the embodiments of the present disclosure clear and concise, the present disclosure omits detailed descriptions of known functions and known components.

A human brain relies mainly on neurons and synapses that transmit information between the neurons to transfer and process information. The neurons are basic units for processing information in a brain nervous system, and the neurons can be used to receive, integrate, filter, store, and transfer information, so that various functional activities of a human are carried out regularly to adapt to changes in internal environment and in external environment.

Figure 1A:
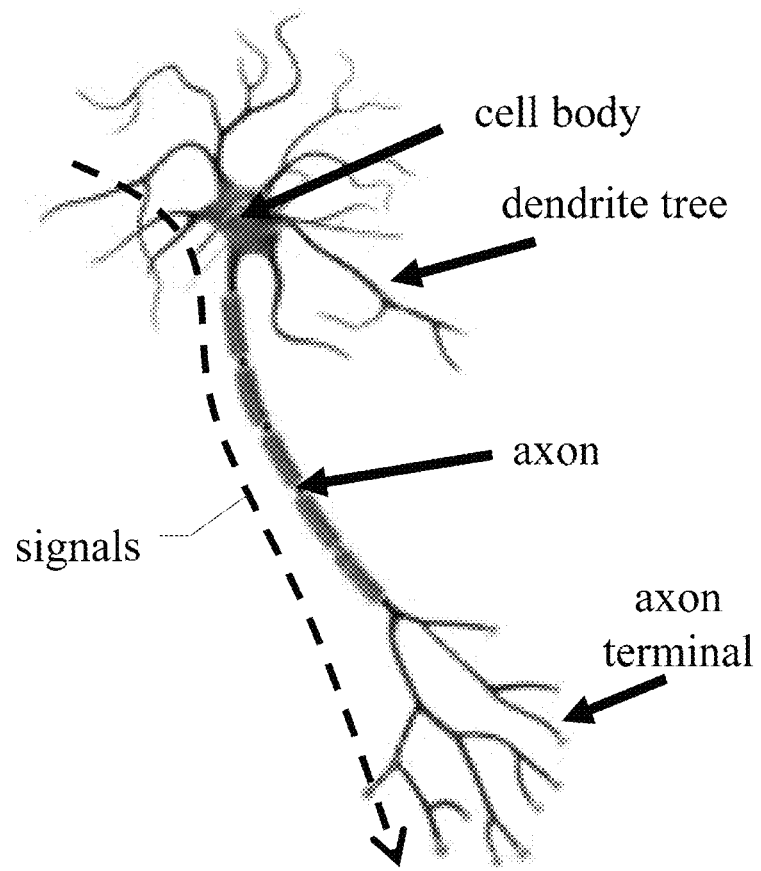
FIG. 1a is a schematic diagram of a biological neuron unit.
Figure 1B:
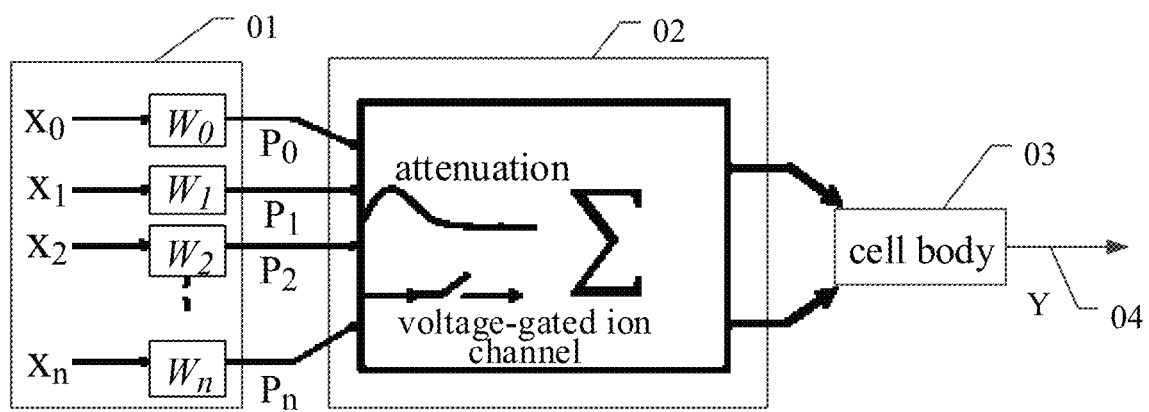
FIG. 1b is a schematic diagram of an information processing model of a neuron.
Figure 1C:
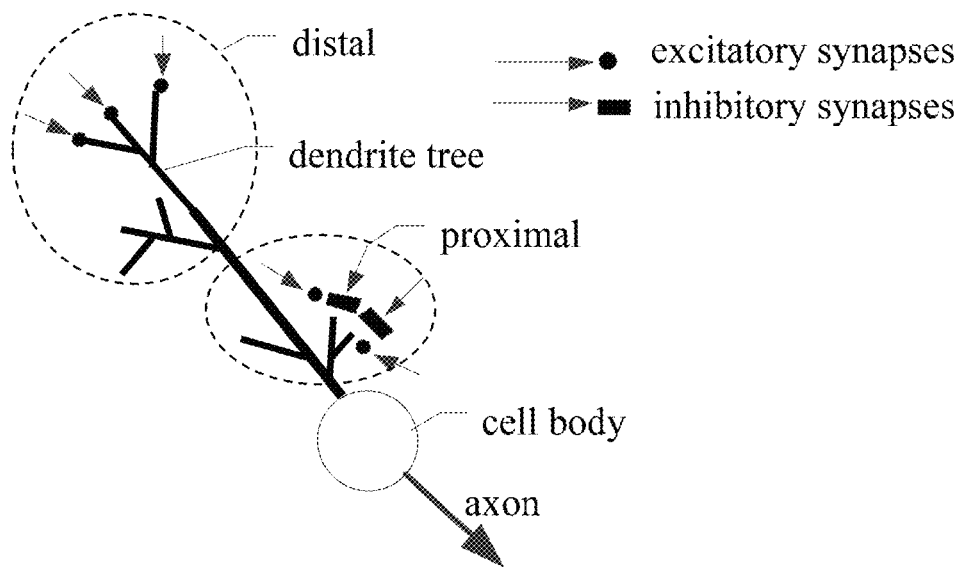
FIG. 1c is a schematic diagram of a dendritic structure.

FIG. 1a is a schematic diagram of a biological neuron unit; FIG. 1b is a schematic diagram of an information processing model of a neuron; and FIG. 1c is a schematic diagram of a dendritic structure.

Neurons are basic units of a neural network, and the neurons can transmit, filter, and integrate information. As shown in FIG. 1a, in a neuron, a signal from the neuron passes through an axon and reaches an axon terminal firstly, leading to change vesicles in the axon terminal, so as to release neurotransmitters. The neurotransmitters enter into a dendrite tree of another neuron through a synaptic gap, receptors on the dendrite tree can accept the neurotransmitters, so as to change permeability of the membrane-to-ion in a cell body, thus a concentration of ions inside a cell membrane and a concentration of ions outside the cell membrane are changed, which in turn changes a potential inside the cell body and a potential outside the cell body. Therefore, information is transmitted from one neuron to another neuron. In a process of information transmission, some axons can form multiple branches at the axon terminals, a potential action from a main branch of the axon can continue to be transmitted on each branch, and eventually reach different target neurons, so that the axons can communicate among multiple neurons. On the other hand, in a neural network structure, the branches of the axon terminals of different neurons can reach dendrites of the same neuron, so as to form a large number of synapses, the neurotransmitters released from different synapses can affect the change in the membrane potential of the cell body of the same neuron, and thus the neurons can integrate input information from different sources. On another hand, in the neurons, the release of neurotransmitters in the synapse and the changes in the membrane potential of the cell body are continuous. When the membrane potential is greater than a threshold, the input information is transmitted through the axon; when the membrane potential is less than the threshold, the input information cannot be transmitted, and therefore, the neurons achieve a function of filtering information.

The neuron is an information processing unit with multiple inputs and single output. The neuron can process information nonlinearly. According to functions and characteristics of the neuron, the neuron can be abstracted as a simple mathematical model. As show in FIG. 1b, in a neuron, $x_0, x_1, x_2, \ldots, x_n$ are signals transmitted by axons of a previous plurality of neurons, $w_0, w_1, w_2, \ldots, w_n$ are transmission efficiency of a synapse 01, the signals $x_0, x_1, x_2, \ldots, x_n$ pass through the synapse 01 to form input signals $P_0, P_1, P_2, \ldots, P_n$ of the neuron, the input signals enter into a dendrite tree 02; then, the dendrite tree 02 and a cell body 03 process the input signals, so as to obtain an output signal Y. The output signal Y is finally transmitted to an axon 04 of the neuron, and the axon 04 can continue to transmit the output signal to other neurons.

When a neuron receives information from other neuron, the dendrite tree 02 can be exhibited as a threshold function, a function of the dendrite tree 02 can be expressed as formula (1):

$$\text{channel} = \begin{cases} 0, & P < \theta \\ 1, & P \geq \theta \end{cases}. \quad (1)$$

When a value of an input signal is greater than a threshold θ, a value of an ion channel is 1, so that a voltage-gated ion channel in the dendrite tree 02 is turned on, and the input signal can be transmitted to the cell body 03. When the value of the input signal is less than the threshold θ, the value of the ion channel is 0, so that the voltage-gated ion channel in the dendrite tree 02 is turned off, the input signal is attenuated during a transmission process in the dendrite tree 02, and cannot be transmitted into the cell body 03. When the cell body 03 receives the input signal transmitted from the dendrite tree 02, a membrane potential of the cell body 03 gradually changes with time, when the change in the membrane potential of the cell body 03 exceeds a certain threshold, the cell body 03 generates an abrupt-rising pulse signal, the abrupt-rising pulse signal is an output signal of the neuron, and then the abrupt-rising pulse signal is transmitted along the axon 04 to other neurons, so as to achieve the information transmission of the neuron.

As shown in FIG. 1c, according to general neuronal theories, about 15% of all dendrites located in a proximal region of the cell body carry both inhibitory synapses and excitatory synapses. The rest 85% of all dendrites located in a distal region of the cell body carry only excitatory synapses. The inhibitory synapses paly a counteracting effect on the excitatory synapses located in the distal region of the cell body, and the inhibitory synapses have no effects on the input signal. Therefore, a potential of the excitatory synapses generated in the dendrites can be represented by adding all excitatory synapses larger than the threshold θ, as shown in formula (2):

$$D_{ex} = \Sigma_{i=1}^n P_i + \Sigma_{j=1}^n P_j + \ldots + \Sigma_{k=1}^n P_k \quad (2)$$

where i, j, and k represents the number of excitatory synaptic inputs. $D_{ex}$ expresses the generated excitatory post synapses potential.

The neuron transmits, filters, and integrates the input signal to form the output signal Y, and then the output signal Y is transmitted to other neurons through the axon. The output signal Y can be expressed as formula (3):

$$Y = D_{ex\text{-}upstream} - D_{inhibit} + D_{ex\text{-}downstream} \quad (3)$$

where $D_{ex\text{-}upstream}$ is the excitatory post synapses potentials generated by the upstream dendrites, $D_{inhibit}$ is the received inhibitory synaptic inputs received by the cell body, and $D_{ex\text{-}downstream}$ is the excitatory post synapses potentials generated by the downstream dendrites.

An artificial neural network is a computer system that mimics the connection of brain neurons through synapses, and can be widely used in image recognition, automatic control, predictive estimation, data analysis and other fields. The artificial neural network mainly uses spatially distributed neuron-like electronic devices and spatially distributed synaptic-like electronic devices to nonlinearly convert input signals into output signals. The artificial neural network can process information in parallel in densely interconnected structures, and the artificial neural network has the characteristics such as nonlinearity, adaptability, and high processing speed.

Currently, in the artificial neural network, a neuron-like electronic device is mainly achieved through circuit design. Due to hardware resource limitations, in the circuit design of the neuron-like electronic device, the most basic integral-and-fire function of a neuron can be implemented through at least one capacitor, six transistors, some resistors, and the like. Therefore, the neuron-like electronic device comprises a relatively complicated circuit structure, and has disadvantages of high power consumption and low ability to handle complex tasks, so that in the artificial neural network, the function of a neuron is simplified. For a human brain, each function of a neuron plays a key role in handling the complex tasks, if only the simplest neuron model is used, the artificial neural network cannot truly mimic the human brain for information processing. Therefore, the development of high-density, low-power neuron-like electronic device has become a bottleneck restricting the development of the artificial neural network.

At least one embodiment of the present disclosure provides a circuit structure, a driving method thereof, and a neural network. The circuit structure comprises: at least one circuit unit. Each circuit unit comprises a first group of resistive switching devices and a second group of resistive switching devices, the first group of resistive switching devices comprises a resistance gradual-change device, the second group of resistive switching devices comprises a resistance abrupt-change device, the first group of resistive switching devices and the second group of resistive switching devices are connected in series, in a case that no voltage is applied, a resistance value of the first group of resistive switching devices is larger than a resistance value of the second group of resistive switching devices. This circuit structure utilizes a resistance gradual-change device and a resistance abrupt-change device connected in series to form a neuron-like structure, so as to mimic functions, such as calculation, integrate-and-fire, attenuation, and filtering, of a human brain neuron. The resistance value of the resistance gradual-change device changes slowly under an external applied voltage, and the resistance gradual-change device can be used to mimic a behavior of an S-shaped growth curve of a biological dendrite. The circuit structure has advantages such as simple structure, low power consumption, small area, ability to implement complex functions, and easy compatibility with standard CMOS manufacturing process. Therefore, the circuit structure, the neural network, and the driving components thereof according to the embodiments of the present disclosure can be fabricated on a same chip through COMS manufacturing process, so that miniaturization of the device can be achieved, and the operation power consumption can also be reduced.

In following descriptions of the present disclosure, a first voltage is smaller than a second voltage, which is taken as an example to describe the present disclosure.

Figure 2A:
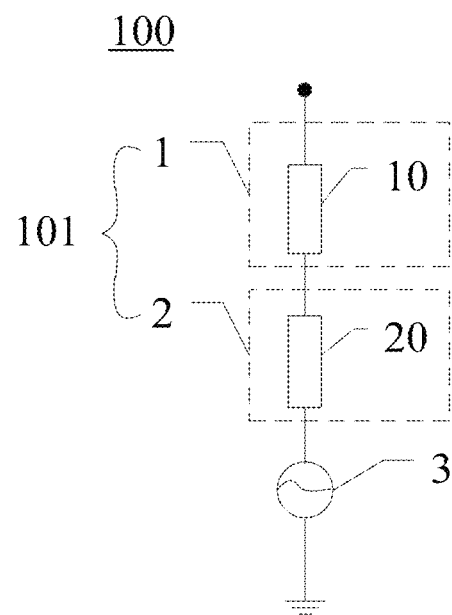
FIG. 2a is a schematic diagram of a circuit structure provided by an embodiment of the present disclosure.

FIG. 2a is a schematic diagram of a circuit structure provided by an embodiment of the present disclosure.

For example, as shown in FIG. 2a, the circuit structure 100 comprises: at least one circuit unit 101, each circuit unit 101 comprises a first group of resistive switching devices 1 and a second group of resistive switching devices 2, the first group of resistive switching devices 1 comprises a resistance gradual-change device 10, the second group of resistive switching devices 2 comprises a resistance abrupt-change device 20, the first group of resistive switching devices 1 and the second group of resistive switching devices 2 are connected in series, in a case that no voltage is applied, a resistance value of the first group of resistive switching devices 1 are larger than a resistance value of the second group of resistive switching devices 2.

The circuit structure utilizes the resistance gradual-change device and the resistance abrupt-change device connected in series to form a neuron-like structure, so as to mimic functions of a human brain neuron. In the circuit structure, the resistance value of the resistance gradual-change device changes slowly under an external applied voltage, and the resistance gradual-change device can be used to mimic a behavior of an S-shaped growth curve of a biological dendrite. In addition, the circuit structure has advantages such as simple structure, low power consumption, small area, ability to implement complex functions, and easy compatibility with standard CMOS manufacturing process.

For example, when an external applied voltage signal is less than a threshold voltage of the resistance gradual-change device 10, a change amplitude of the resistance value of the resistance gradual-change device 10 is relatively smaller; however, when the external applied voltage signal is greater than the threshold voltage of the resistance gradual-change device 10, the change amplitude of the resistance value of the resistance gradual-change device 10 increases. That is, as the external applied voltage signal increases, the change amplitude of the resistance value of the resistance gradual-change device 10 also gradually increases. For example, when the first voltage is smaller than the threshold voltage of the resistance gradual-change device 10, and the second voltage is greater than the threshold voltage of the resistance gradual-change device 10, the change amplitude of the resistance value of the resistance gradual-change device 10 under the first voltage is smaller than the change amplitude of the resistance value of the resistance gradual-change device 10 under the second voltage. The threshold voltage of the resistance gradual-change device 10 is related to the material of the resistance gradual-change device 10 and the like.

For example, as shown in FIG. 2a, a current detector 3 may be provided in the circuit structure 100, and the current detector 3 can be used to detect a response current in the circuit unit 101. The current detector 3 may be, for example, an ammeter or the like.

For example, the resistance gradual-change device 10 has a first resistance value, the resistance abrupt-change device 20 has a second resistance value, in the case that no voltage is applied, a range of the first resistance value is 1-100 megohms, and a range of the second resistance value is 1-1000 kilohms. The resistance value of the resistance gradual-change device 10 and the resistance value of the resistance abrupt-change device 20 are significantly different from each other, and the resistance value of the resistance gradual-change device 10 is greater than the resistance value of the resistance abrupt-change device 20, thus when the external applied voltage signal is applied to the circuit unit 101, in an initial stage, the external applied voltage signal is almost entirely applied to the resistance gradual-change device 10, so that the resistance value of the resistance gradual-change device 10 slowly decreases, and the response current in the entire circuit unit 101 slowly increases; when the resistance value of the resistance gradual-change device 10 decreases to a certain degree, for example, when the resistance value of the resistance gradual-change device 10 is not significantly different from the resistance value of the resistance abrupt-change device 20, or the resistance value of the resistance gradual-change device 10 is less than the resistance value of the resistance abrupt-change device 20, the partial voltage on the resistance gradual-change device 10 is transferred to the resistance abrupt-change device 20, so that the resistance value of the resistance abrupt-change device 20 abruptly and sharply decreases, the response current in the entire circuit unit 101 suddenly increases, so as to form a rising pulse current that can be transmitted. In this process, most of the external applied voltage signal is applied to the resistance gradual-change device 10, the process that the response current in the circuit unit 101 changes slowly corresponds to an integration stage; and the process that the external applied voltage signal is transferred to the resistance abrupt-change device 20 and the response current in the circuit unit 101 suddenly increases corresponds to an emission stage, so that the circuit structure 100 can achieve an integral-and-sending function of a neuron.

It should be noted that, when a constant external applied voltage signal is applied to the resistance gradual-change device 10, at the beginning, the resistance value of the resistance gradual-change device 10 gradually decreases, and after the resistance value of the resistance gradual-change device 10 decreases to a certain degree, the resistance value of the resistance gradual-change device 10 cannot continue to decrease. Under different external applied voltage signals, reduction degrees of resistance value of the resistance gradual-change device 10 are different. For example, if the first voltage is applied to the resistance gradual-change device 10, a change amplitude of the resistance value of the resistance gradual-change device 10 is $\Delta R1$; however, if the second voltage is applied to the resistance gradual-change device 10, a change amplitude of the resistance value of the resistance gradual-change device 10 is $\Delta R2$; then $\Delta R2$ is greater than $\Delta R1$, where $\Delta R1$ and $\Delta R2$ represent an absolute value of the change amplitude of the resistance value of the resistance gradual-change device 10.

Figure 2B:
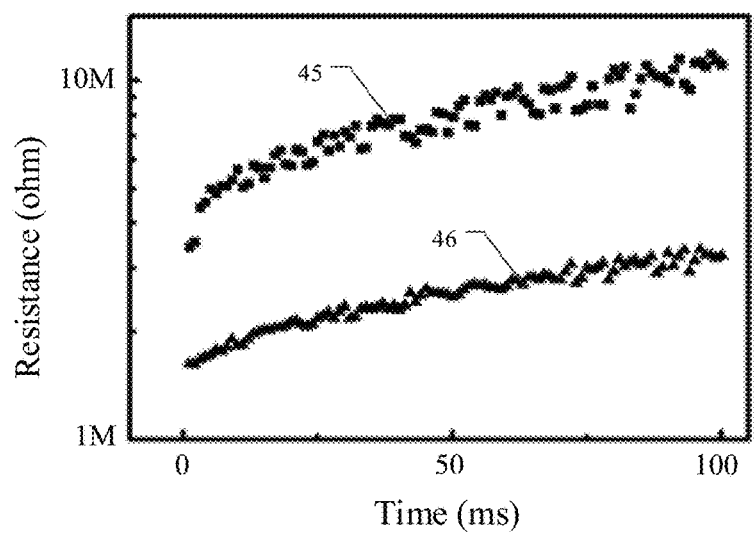
FIG. 2b is a schematic diagram of a resistance change curve of a resistance gradual-change device during an attenuation process provided by an embodiment of the present disclosure.

For example, after the external applied voltage signal is removed, the resistance value of the resistance gradual-change device 10 gradually returns to the initial resistance state thereof, and the resistance value of the resistance abrupt-change device 20 also gradually returns to the initial resistance state thereof, so that the circuit structure 100 can also achieve an attenuation function of a neuron. For example, after the external applied voltage signal is removed, the resistance gradual-change device 10 quickly returns to the initial resistance state thereof, and the recovery time is in the order of milliseconds, the recovery time is related to the external applied voltage signal, the resistance value of the device itself, and the like. For example, the recovery time of the resistance gradual-change device 10 provided by the embodiments of the present disclosure is 50-60 milliseconds. In the attenuation process of the resistance gradual-change device shown in FIG. 2b, the resistance value of the resistance gradual-change device 10 is 10M$\Omega$. As shown in FIG. 2b, the curve 45 represents an attenuation process after the first voltage is applied to the resistance gradual-change device 10, and the curve 46 represents an attenuation process after the second voltage is applied to the resistance gradual-change device 10. As it can be seen from FIG. 2b, under a larger external applied voltage signal, the change amplitude of the resistance value of the resistance gradual-change device 10 is larger, and the recovery time of the resistance value of the resistance gradual-change device 10 is also longer. For example, as shown in FIG. 2b, under the first voltage, the resistance value of the resistance gradual-change device 10 decreases to about 3M$\Omega$, and the recovery time is about 70 ms; however, under the second voltage, the resistance value of the resistance gradual-change device 10 decreases to less than 2MΩ, and the recovery time is greater than 100 ms.

In summary, under the external applied voltage signal, the resistance gradual-change device 10 exhibits a characteristic that the resistance value slowly increases; after the external applied voltage signal applied to the resistance abrupt-change device 20 reach a threshold voltage of the resistance abrupt-change device 20, the resistance abrupt-change device 20 exhibits a characteristic that the resistance value suddenly and sharply decreases; after the external applied voltage signal is removed, the resistance value of the resistance gradual-change device 10 gradually returns to the initial resistance state thereof, and the resistance value of the resistance abrupt-change device 20 also gradually returns to the initial resistance state thereof. Therefore, the circuit structure 100 provided by the embodiment of the present disclosure can mimic a behavior of a neuron, the resistance gradual-change device 10 can be used to mimic a behavior of a dendrite tree, so that the resistance gradual-change device 10 can be used as a key component in a brain-like neural network chip.

Figure 3A:
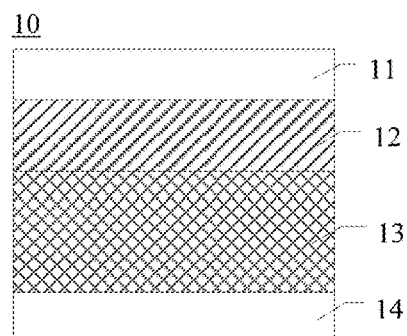
FIG. 3a is a structural schematic diagram of a resistance gradual-change device provided by an embodiment of the present disclosure.

FIG. 3a is a structural schematic diagram of a resistance gradual-change device provided by an embodiment of the present disclosure; and FIGS. 3b-3g are schematic diagrams of curves of various electrical characteristics of a resistance gradual-change device provided by an embodiment of the present disclosure.

For example, as shown in FIG. 3a, the resistance gradual-change device 10 provided by an embodiment of the present disclosure comprises a first oxide layer 12 and a second oxide layer 13, which are laminated together, and an oxygen content of the first oxide layer 12 is higher than an oxygen content of the second oxide layer 13. It should be noted that, the oxygen content is a molar percentage of oxygen in an oxide herein.

For example, materials of the first oxide layer 12 and the second oxide layer 13 are metal oxides. For example, the material of the first oxide layer 12 may be tantalum pentoxide ($Ta_5O_2$), aluminum oxide ($Al_2O_3$), or the like, and the material of the second oxide layer 13 may be tantalum dioxide ($TaO_2$), etc.

For example, the resistance gradual-change device 10 further comprises a first electrode layer 11 and a second electrode layer 14, the first oxide layer 12 and the second oxide layer 13 are disposed between the first electrode layer 11 and the second electrode layer 14, the first electrode layer 11 is electrically connected with the first oxide layer 12, and the second electrode layer 14 is electrically connected with the second oxide layer 13.

For example, a material of the first electrode layer 11 is an active metal, so that under the external applied voltage signal, the resistance value of the resistance gradual-change device 10 changes slowly. The active metal, for example, may be aluminum (Al), nickel (Ni), titanium (Ti) and so on. A material of the second electrode layer 14 may be a conductive material such as metal, and the material of the second electrode layer 14 may be copper (Cu), aluminum (Al), tungsten (W) and so on.

Figure 3B:
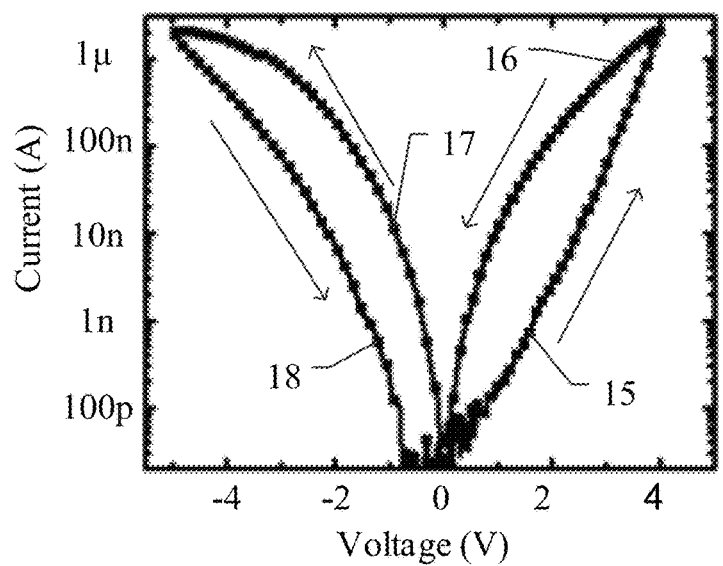
FIG. 3b is a schematic diagram of a voltage-current curve of a resistance gradual-change device provided by an embodiment of the present disclosure.

For example, the resistance gradual-change device 10 can be used to mimic the behavior of an S-shaped growth curve of a dendrite tree in a neuron, and under the external applied voltage signal, the resistance value of the resistance gradual-change device 10 changes slowly. As shown in FIG. 3b, when a positive voltage and a negative voltage are applied to the resistance gradual-change device 10 respectively, change amplitudes of the resistance value of the resistance gradual-change device 10 are different. Under the positive voltage, if a forward scan is performed on the resistance gradual-change device 10, that is, the positive voltage gradually increases from 0V to 4V, in this case, a voltage-current curve of the resistance gradual-change device 10 is represented by the curve 15, and at this point, the resistance value of the resistance gradual-change device 10 decreases with the increase of the positive voltage; if a reverse scan is performed on the resistance gradual-change device 10, that is, the positive voltage gradually decreases from 4V to 0V, in this case, a voltage-current curve of the resistance gradual-change device 10 is represented by the curve 16, and at this point, the resistance value of the resistance gradual-change device 10 slowly decreases with the decrease of the positive voltage. Under the negative voltage, if the forward scan is performed on the resistance gradual-change device 10, that is, the negative voltage gradually decreases from 0V to −4V, in this case, a voltage-current curve of the resistance gradual-change device 10 is represented by the curve 17, and at this point, the resistance value of the resistance gradual-change device 10 increases with the increase of the negative voltage; if the reverse scan is performed on the resistance gradual-change device 10, that is, the negative voltage gradually increases from −4V to 0V, in this case, a voltage-current curve of the resistance gradual-change device 10 is represented by the curve 18, and at this point, the resistance value of the resistance gradual-change device 10 slowly increases with the decrease of the positive voltage.

Figure 3C:
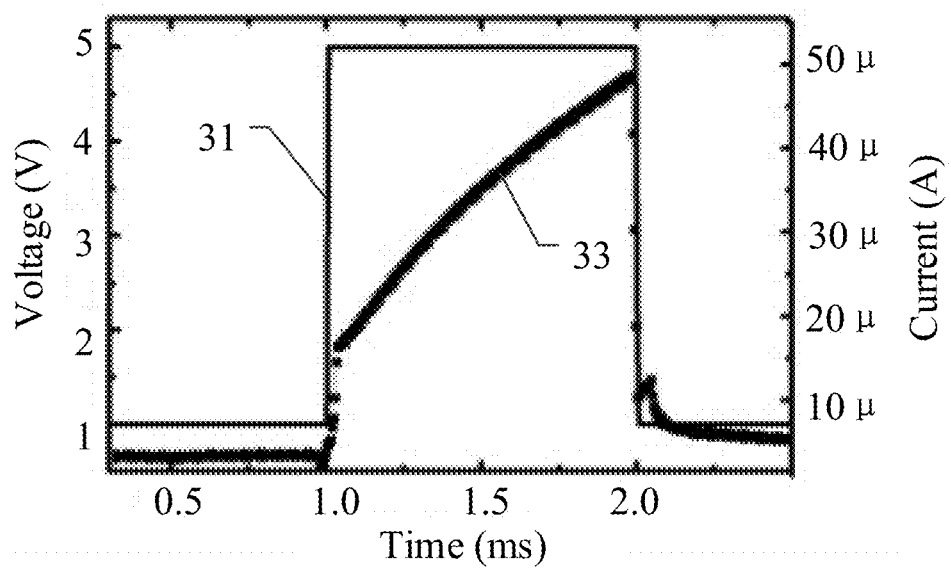
FIG. 3c is a schematic diagram of a response current curve of a resistance gradual-change device under a positive voltage provided by an embodiment of the present disclosure.
Figure 3D:
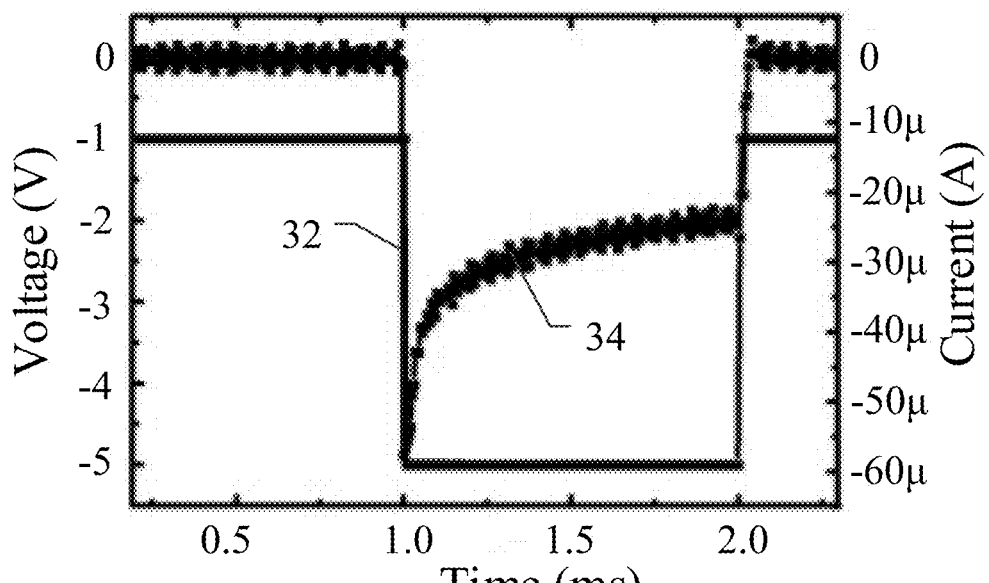
FIG. 3d is a schematic diagram of a response current curve of a resistance gradual-change device under a negative voltage provided by an embodiment of the present disclosure.

For example, the resistance value of the resistance gradual-change device 10 decreases with the increase of the positive voltage, that is, the response current of the resistance gradual-change device 10 increases non-linearly with the increase of the positive voltage; however, the resistance value of the resistance gradual-change device 10 increases with the increase of the positive voltage, that is, the response current of the resistance gradual-change device 10 decreases or does not change with the increase of the negative voltage. For example, as shown in FIG. 3c and FIG. 3d, a positive voltage 31 is applied to the resistance gradual-change device 10, a positive response current 33 of the resistance gradual-change device 10 gradually increases with time, that is, under the positive voltage 31, the resistance value of the resistance gradual-change device 10 gradually decreases; a negative voltage 32 is applied to the resistance gradual-change device 10, a negative response current 34 of the resistance gradual-change device 10 decreases slowly with time, that is, under the negative voltage 32, the resistance value of the resistance gradual-change device 10 gradually increases. As shown in FIG. 3c and FIG. 3d, during the same response time, when an absolute value of the positive voltage 31 and an absolute value of the negative voltage 31 are equal to each other, the change amplitude in the positive response current 33 is greater than the change amplitude in the negative response current 34, that is, the change amplitude in the resistance value of the resistance gradual-change device 10 under the positive voltage 31 is greater than the change amplitude in the resistance value of the resistance gradual-change device 10 under the negative voltage 32. It should be noted that, during the response time, the voltage value of the positive voltage 31 and the voltage value of the negative voltage 32 remain constant.

In summary, the resistance gradual-change device 10 provided by an embodiment of the present disclosure can further mimic a function of the synapse. When a positive voltage is applied to the resistance gradual-change device 10, and a forward scan is performed on the resistance gradual-change device 10, the resistance value of the resistance gradual-change device 10 gradually decreases, and the response current of the resistance gradual-change device 10 gradually increases, so that the resistance gradual-change device 10 can be used to mimic an excitatory synapse. When a negative voltage is applied to the resistance gradual-change device 10, and a forward scan is performed on the resistance gradual-change device 10, the resistance value of the resistance gradual-change device 10 gradually increases, and the response current of the resistance gradual-change device 10 gradually decreases, so that the resistance gradual-change device 10 can be used to mimic an inhibitory synapse.

Figure 3E:
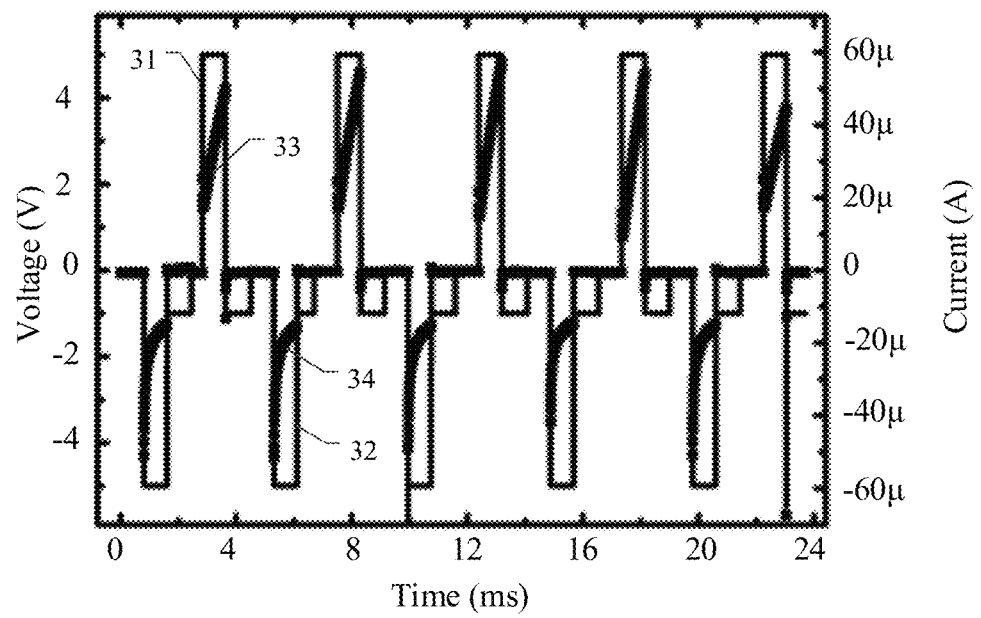
FIG. 3e is a schematic diagram of a response current curve when a positive voltage and a negative voltage are alternately applied to a resistance gradual-change device provided by an embodiment of the present disclosure.
Figure 3F:
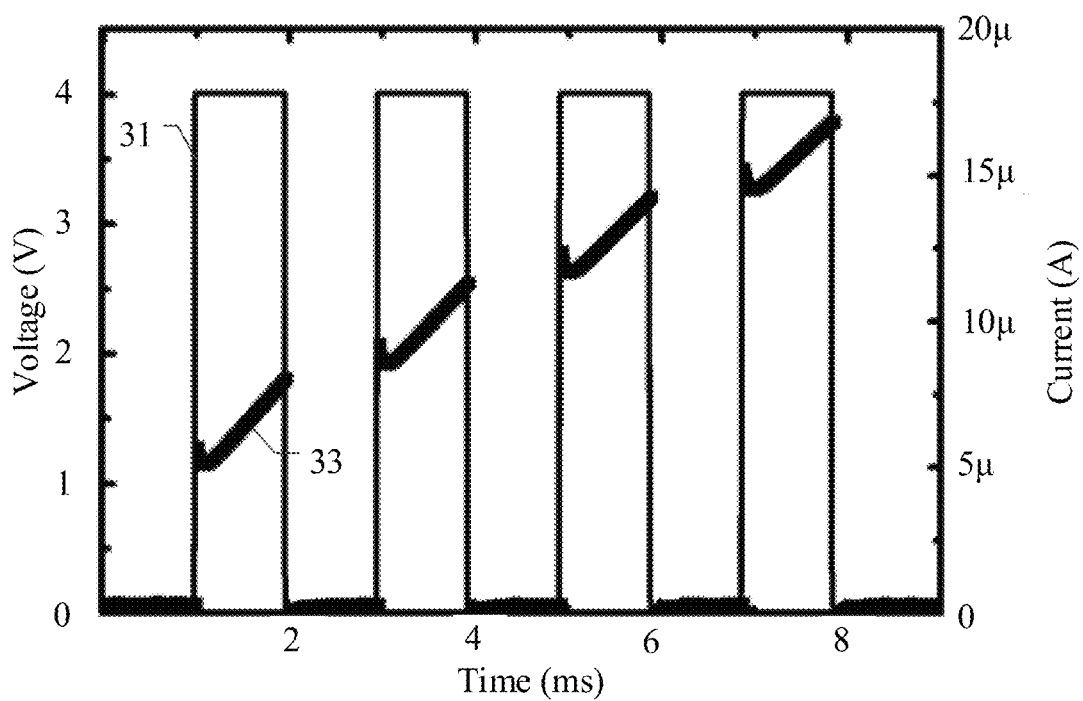
FIG. 3f is a schematic diagram of a response current curve when a positive voltage is continuously applied to a resistance gradual-change device provided by an embodiment of the present disclosure.

For example, as shown in FIG. 3e, when the positive voltage 31 and the negative voltage 32 are alternately applied to the resistance gradual-change device 10, the positive response current 33 and the negative response current 34 of the resistance gradual-change device 10 are alternately generated. As time lapses, the response currents of the resistance gradual-change device 10 cancel each other out and the response currents cannot be accumulated. As shown in FIG. 3f, when the positive voltage 31 is continuously applied to the resistance gradual-change device 10, the positive response current 33 of the resistance gradual-change device 10 gradually increases with time.

Figure 3G:
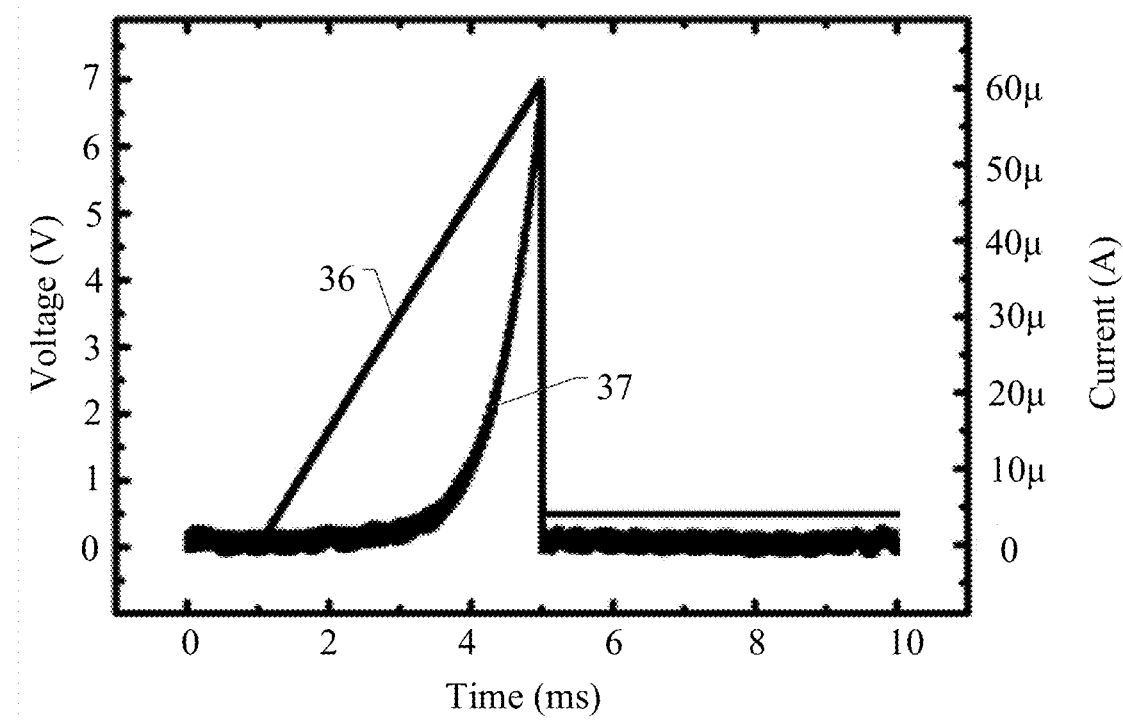
FIG. 3g is a schematic diagram of a filtering function of a resistance gradual-change device provided by an embodiment of the present disclosure.

For example, the resistance gradual-change device 10 provided by an embodiment of the present disclosure may further achieve a filtering function of a dendrite tree. A threshold voltage of the resistance gradual-change device 10 may be, for example, 3V, as shown in FIG. 3g, a voltage signal 36 is applied to the resistance gradual-change device 10, when a value of the voltage signal 36 is less than 3V, a response current 37 of the resistance gradual-change device 10 is relatively small (almost 0 μA), at this point, the circuit unit does not transmit a signal (the signal is the response current). When the value of the voltage signal 36 is greater than 3V, the response current 37 of the resistance gradual-change device 10 increases sharply, at this time, the circuit unit begins to transmit the signal. That is, when the value of the voltage signal 36 is less than 3V, the circuit unit cannot transmit the signal, so that the resistance gradual-change device 10 can filter out voltage signals, voltage values of which are less than 3V.

It should be noted that, applying a positive voltage to the resistance gradual-change device 10 indicates that a voltage applied to the first electrode layer 11 is greater than a voltage applied to the second electrode layer 14; and applying a negative voltage to the resistance gradual-change device 10 indicates that a voltage applied to the first electrode layer 11 is less than a voltage applied to the second electrode layer 14.

Figure 4A:
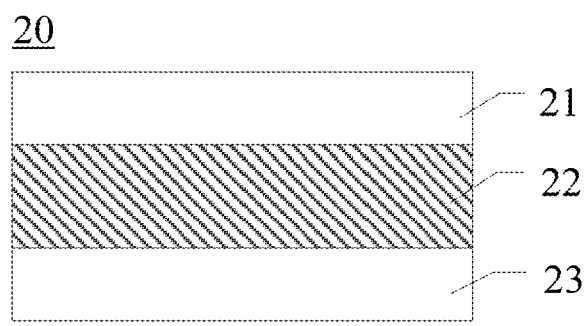
FIG. 4a is a structural schematic diagram of a resistance abrupt-change device provided by an embodiment of the present disclosure.
Figure 4B:
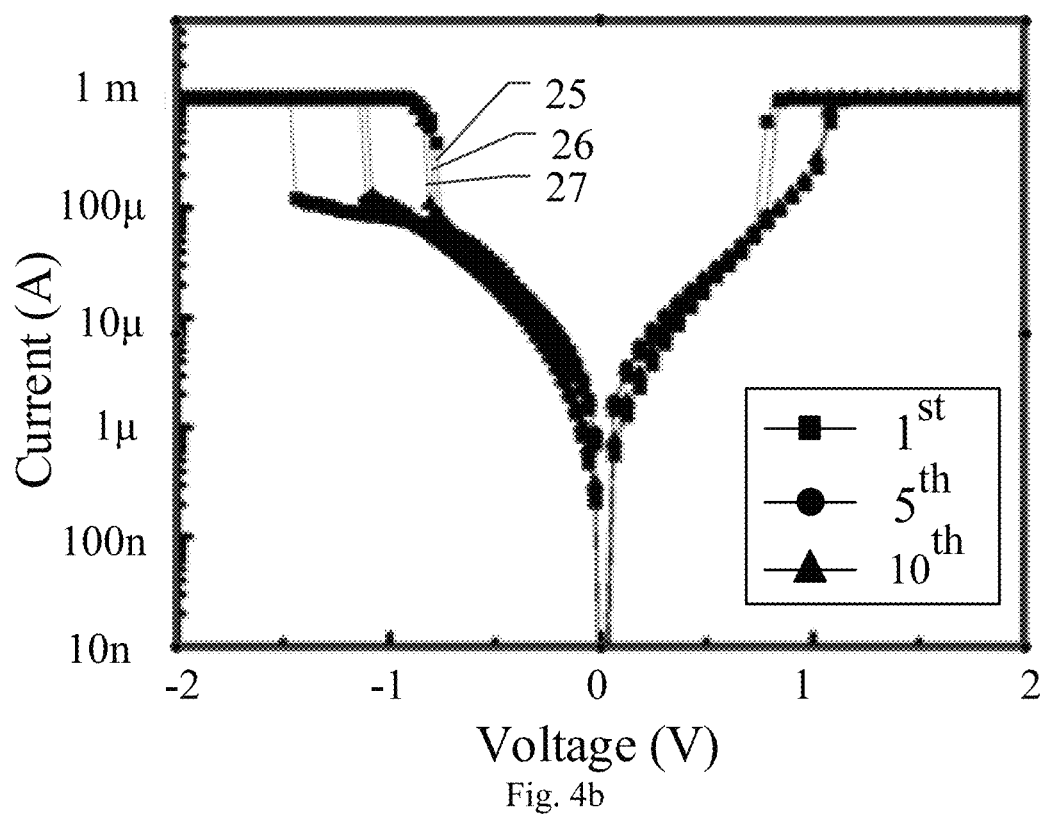
FIG. 4b is a schematic diagram of a voltage-current curve of a resistance abrupt-change device provided by an embodiment of the present disclosure.

FIG. 4a is a structural schematic diagram of a resistance abrupt-change device provided by an embodiment of the present disclosure; FIG. 4b is a schematic diagram of a voltage-current curve of a resistance abrupt-change device provided by an embodiment of the present disclosure.

For example, as shown in FIG. 4a, the resistance abrupt-change device 20 provided by an embodiment of the present disclosure comprises a third electrode layer 21, a third oxide layer 22 and a fourth electrode layer 23, which are laminated together, and the third oxide layer 22 is disposed between the third electrode layer 21 and the fourth electrode layer 23.

For example, a material of the third oxide layer 22 is a metal oxide. For example, the metal oxide may be tantalum pentoxide ($Ta_5O_2$), vanadium oxide ($VO_2$), niobium oxide ($NbO_2$), or the like.

For example, a material of the third electrode layer 21 may be an inert metal, so that under the external applied voltage signal, the resistance value of the resistance abrupt-change device 20 suddenly changes. The inert metal, for example, may be platinum (Pt), ruthenium (Ru), iridium (Ir), palladium (Pd), or the like. A material of the fourth electrode layer 23 may be a conductive material such as metal, and the material of the fourth electrode layer 23 may be copper (Cu), aluminum (Al), tungsten (W) and so on.

For example, a voltage signal is applied to the resistance abrupt-change device 20, and before the voltage signal reaches to a threshold voltage of the resistance abrupt-change device 20, the resistance value of the resistance abrupt-change device 20 is substantially constant. When the voltage signal reaches the threshold voltage of the resistance abrupt-change device 20, the resistance value of the resistance abrupt-change device 20 abruptly changes. A resistance test is performed on the resistance abrupt-change device 20, and the voltage-current curve of the resistance abrupt-change device 20 is shown in FIG. 4b. Under a positive voltage, a forward scan is performed on the resistance abrupt-change device 20, when the positive voltage is about 1V, the resistance value of the resistance abrupt-change device 20 abruptly and rapidly decreases; under a negative voltage, the forward scan is performed on the resistance abrupt-change device 20, when the negative voltage is about −1V, the resistance value of the resistance abrupt-change device 20 abruptly and rapidly decreases. The curve 25, the curve 26, and the curve 27 represent graphs that one resistance test, five resistance tests, and ten resistance tests are performed on the resistance abrupt-change device 20 respectively. As it can be seen from FIG. 4b, a plurality of resistance tests are performed on the resistance abrupt-change device 20, the resistance abrupt-change device 20 exhibits the same characteristics, that is, the resistance abrupt-change device 20 can be used repeatedly but maintain the same characteristics.

It should be noted that, applying a positive voltage to the resistance abrupt-change device 20 indicates that a voltage applied to the third electrode layer 21 is greater than a voltage applied to the fourth electrode layer 23; and applying a negative voltage to the resistance abrupt-change device 20 indicates that a voltage applied to the third electrode layer 21 is less than a voltage applied to the fourth electrode layer 23.

For example, after the external applied voltage signal is removed, the resistance value of the resistance gradual-change device 10 gradually returns to an initial resistance state thereof, and the resistance value of the resistance abrupt-change device 20 also gradually returns to an initial resistance state thereof, the recovery time is in the order of milliseconds, and the recovery time depends on factors such as the voltage values applied to the resistance gradual-change device 10 and the resistance abrupt-change device 20, and the time of applying voltage. The larger the voltage values are, the shorter the recovery time is. For example, the recovery time of the resistance abrupt-change device 20 provided by an embodiment of the present disclosure is less than 1 s.

Figure 5A:
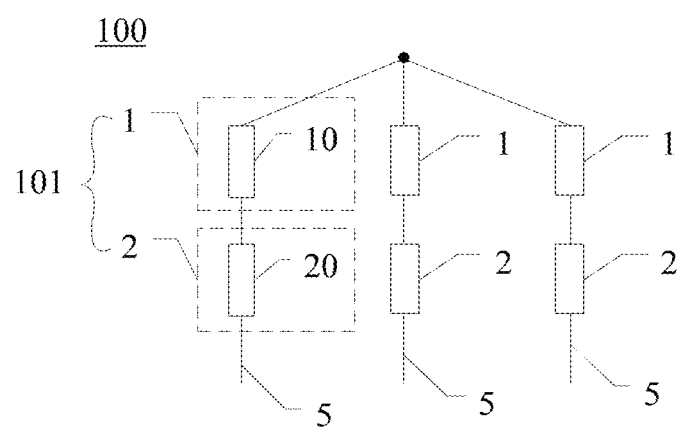
FIGS. 5a and 5b are schematic diagrams of a circuit structure provided by a first example of an embodiment of the present disclosure.
Figure 5B:
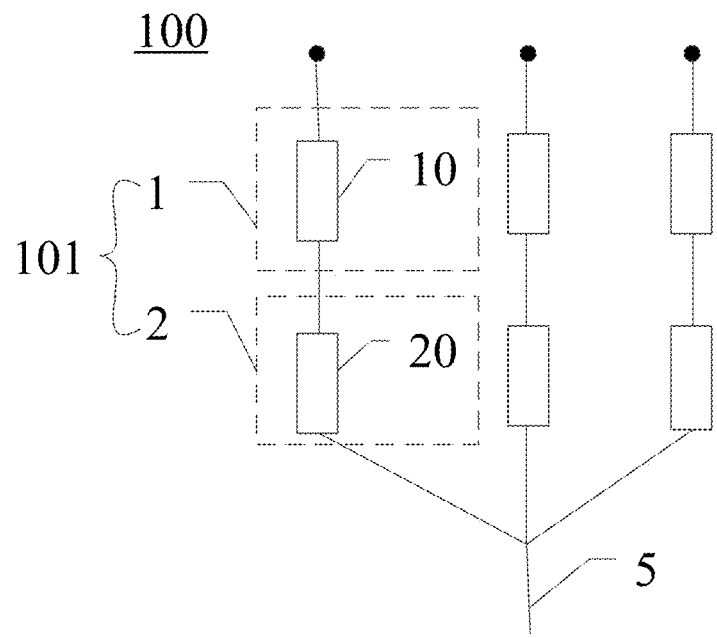

FIGS. 5a and 5b are schematic diagrams of a circuit structure provided by a first example of an embodiment of the present disclosure.

For example, in the circuit structure provided by the first example, the first group of resistive switching devices 1 may comprise a plurality of resistance gradual-change devices 10, the second group of resistive switching devices 2 may comprise a plurality of resistance abrupt-change devices 20, and the plurality of resistance gradual-change devices 10 are respectively connected in series with the plurality of resistance abrupt-change devices 20 in one-to-one correspondence. It should be noted that, in each circuit unit 101, at least two resistance gradual-change devices 10 may be connected in parallel, so that each circuit unit 101 can implement to transmit signals synchronously through multi-channels.

For example, as shown in FIG. 5a, in each circuit unit 101, the first group of resistive switching devices 1 comprises a resistance gradual-change device 10, and the second group of resistive switching devices 2 comprises a resistance abrupt-change device 20.

For example, a plurality of circuit units 101 may be connected in parallel, so as to synchronously transmit signals through multi-channels. As shown in FIG. 5a, the plurality of circuit units 101 may receive a same input signal; as shown in FIG. 5b, the plurality of circuit units 101 may also receive different input signals. It should be noted that, the plurality of circuit units 101 also may be connected in series.

For example, as shown in FIG. 5a, output signals output from the plurality of circuit units 101 may be respectively transmitted to different channels 5, and can be transmitted simultaneously in the different channels 5, and eventually the output signals reach to different target units. Each circuit unit 101 can correspond to a channel 5, and further correspond to a target unit; however; each circuit unit 101 can also correspond to multiple channels 5 and further correspond to multiple target units. As shown in FIG. 5b, the output signals output from the plurality of circuit units 101 can also be integrated, and the obtained integrated output signal can be transmitted to a same channel 5 and finally transmitted to a target unit, so that each target unit corresponds to multiple circuit units 101; the integrated output signal can also be simultaneously transmitted to different target units through different channels 5.

It should be noted that, the plurality of circuit units 101 may also be partially integrated. For example, in the circuit structure 100, output signals output from every adjacent five circuit units 101 can be integrated, and then an integrated output signal can be transmitted to a target unit through a channel 5. The plurality of circuit units 101 can be arranged in different combination ways to satisfy different actual needs, so as to achieve most of the functions of the human brain neuron.

Figure 5C:
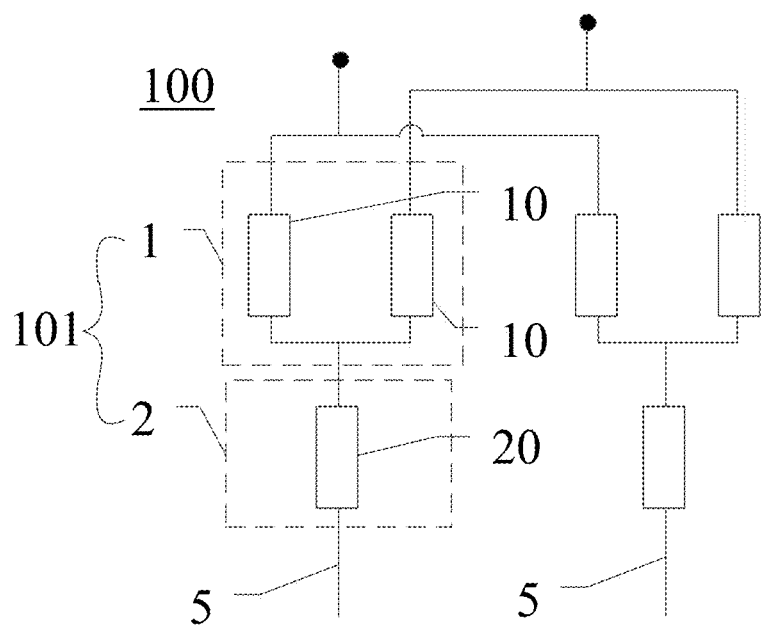
FIG. 5c is a schematic diagram of a circuit structure provided by a second example of an embodiment of the present disclosure.

FIG. 5c is a schematic diagram of a circuit structure provided by a second example of an embodiment of the present disclosure.

For example, in the circuit structure provided by the second example, the first group of resistive switching devices 1 comprises a plurality of resistance gradual-change devices 10, the second group of resistive switching devices 2 comprises one resistance abrupt-change device 20, the plurality of resistance gradual-change devices 10 correspond to the one resistance abrupt-change device 20 and are respectively connected in series with the one resistance abrupt-change device 20.

For example, in the second example, the arrangement of the circuit units 101 may be the same as or different from that in the above first example, and similar descriptions will be omitted here.

For example, in the plurality of resistance gradual-change devices 10, at least two resistance gradual-change devices 10 are connected in parallel, that is, one resistance abrupt-change device 20 can correspond to multiple resistance gradual-change devices 10, and transmit signals that are from different resistance gradual-change devices 10. The different resistance gradual-change devices 10 correspond to the same resistance abrupt-change device 20 and form different information transmission channels, so that a quantity of the resistance abrupt-change devices 20 in the circuit structure 100 can be reduced, and the production cost can be saved.

For example, in the plurality of resistance gradual-change devices 10, resistance values of at least two resistance gradual-change devices 10 are different. Different resistance gradual-change devices 10 can be selected by controlling the external applied voltage signals, so that different input signals (that is, the external applied voltage signals) can be transmitted through different information transmission channels, thereby implementing different functions. For example, when a same external applied voltage signal is applied to the plurality of resistance gradual-change devices 10, the plurality of resistance gradual-change devices 10 having different resistance values have different response currents, so that different resistance gradual-change devices 10 can be selected by the same input signal; when different external applied voltage signals are applied to the plurality of resistance gradual-change devices 10 respectively, the plurality of resistance gradual-change devices 10 having different resistance values may have the same response current, different input signals can generate the same output signal, so that input signals in a certain range can be selected.

For example, as shown in FIG. 5c, in each circuit unit 101, the first group of resistive switching devices 1 comprises two resistance gradual-change devices 10 which are connected in parallel, and the second group of resistive switching devices 2 comprises one resistance abrupt-change device 20. The two resistance gradual-change devices 10 which are connected in parallel can receive different input signals.

Figure 5D:
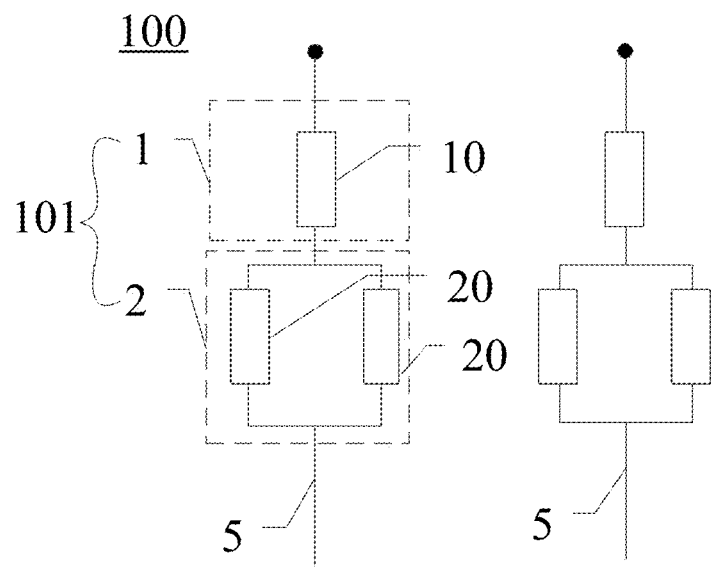
FIG. 5d is a schematic diagram of a circuit structure provided by a third example of an embodiment of the present disclosure.

FIG. 5d is a schematic diagram of a circuit structure provided by a third example of an embodiment of the present disclosure.

For example, in the circuit structure provided by the third example, the first group of resistive switching devices 1 comprises one resistance gradual-change device 10, the second group of resistive switching devices 2 comprises a plurality of resistance abrupt-change devices 20, the one resistance gradual-change device 10 corresponds to the plurality of resistance abrupt-change devices 20 and is connected in series with the plurality of resistance abrupt-change devices 20 respectively For example, in the third example, the arrangement of the circuit units 101 also may be the same as or different from that in the above first example, and similar descriptions will be omitted here.

For example, in the plurality of resistance abrupt-change devices 20, at least two resistance abrupt-change devices 20 are connected in parallel, that is, one resistance gradual-change device 10 may correspond to multiple resistance abrupt-change devices 20 and transmit the signal to different resistance abrupt-change devices 20. The different resistance abrupt-change devices 20 correspond to the same resistance gradual-change device 10 and form different information transmission channels, so that the quantity of the resistance gradual-change device 10 in the circuit structure 100 can be reduced, and the production cost can be saved.

For example, in the plurality of resistance abrupt-change devices 20, threshold voltages of at least two resistance abrupt-change devices 20 are different. Different resistance abrupt-change devices 20 can be selected by controlling the external applied voltage signals, so that different input signals (that is, the external applied voltage signals) can be transmitted through different information transmission channels. For example, as shown in FIG. 5d, the second group of resistive switching devices 2 comprises two resistance abrupt-change devices 20, and the two resistance abrupt-change devices 20 are connected in parallel, so that a resistance value of the second group of resistive switching devices 2 is smaller than a resistance value of any one of the two resistance abrupt-change devices 20. During an integration stage, the second group of resistive switching devices 2 may obtain a smaller external applied voltage signal, and the second group of resistive switching devices 2 has less influence on the response current of the entire circuit unit 101. As shown in FIG. 5*d*, the two resistance abrupt-change devices 20 can be applied with the same external applied voltage signal; it should be noted that, the two resistance abrupt-change devices 20 also can be applied with different external applied voltage signals.

It should be noted that, the arrangements of the resistance gradual-change devices 10 and the resistance abrupt-change devices 20 are not limited to the above-mentioned embodiments, and according to actual requirement, the resistance gradual-change devices 10 and the resistance abrupt-change devices 20 can be arranged in various combination ways, so as to achieve different functions.

Figure 6A:
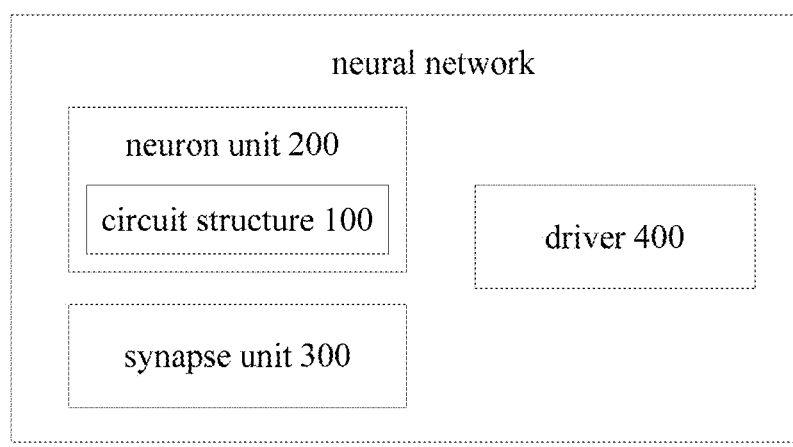
FIG. 6a is a block diagram of a neural network provided by an embodiment of the present disclosure.
Figure 6B:
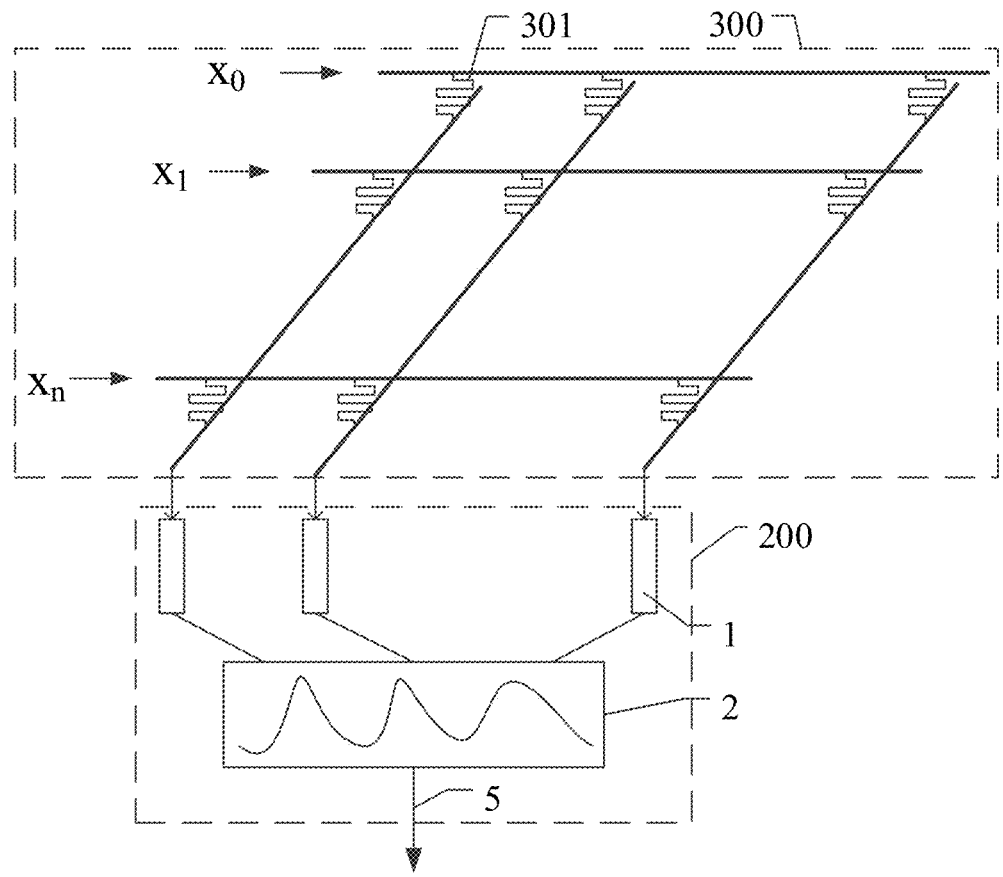
FIG. 6b is a structural schematic diagram of a neural network provided by an embodiment of the present disclosure.

An embodiment of the present disclosure provides a neural network. FIG. 6*a* is a block diagram of a neural network provided by an embodiment of the present disclosure; FIG. 6*b* is a structural schematic diagram of a neural network provided by an embodiment of the present disclosure; and FIGS. 6*c*-6*e* are structural schematic diagrams of different neuron units provided by an embodiment of the present disclosure.

For example, as shown in FIG. 6*a*, the neural network comprises a neuron unit 200. The neuron unit 200 comprises the circuit structure 100 provided by any one of the above embodiments.

For example, the neuron unit 200 further comprises at least one signal line. One end of the circuit unit 101 is connected with the signal line, and the other end of the circuit unit 101 is connected with a ground line. It should be noted that, two ends of the circuit unit 101 can be connected with signal lines, provided that it is ensured that the two ends of the circuit unit 101 have a voltage difference.

Figure 6C:
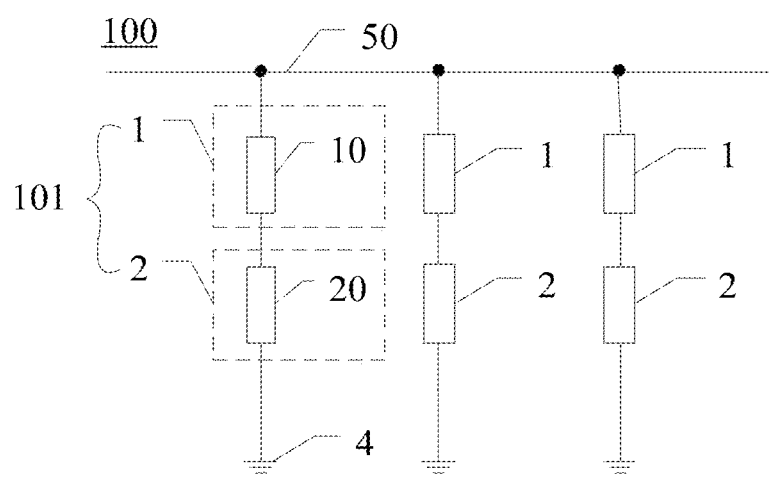
FIG. 6c is a structural schematic diagram of a neuron unit of a neural network provided by an embodiment of the present disclosure.
Figure 6D:
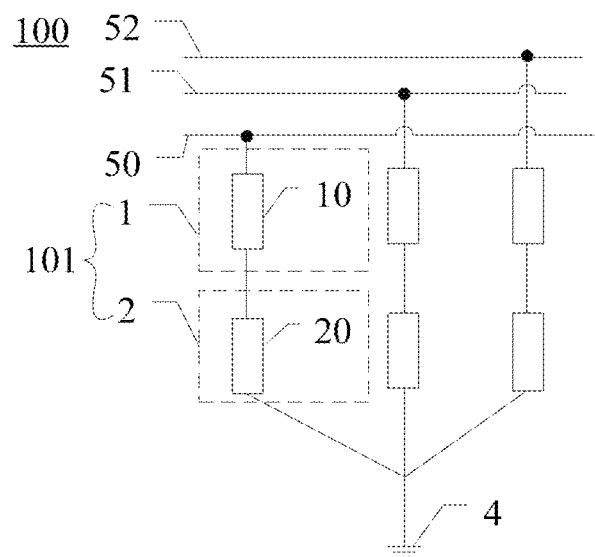
FIG. 6d is a structural schematic diagram of another neuron unit of a neural network provided by an embodiment of the present disclosure.
Figure 6E:
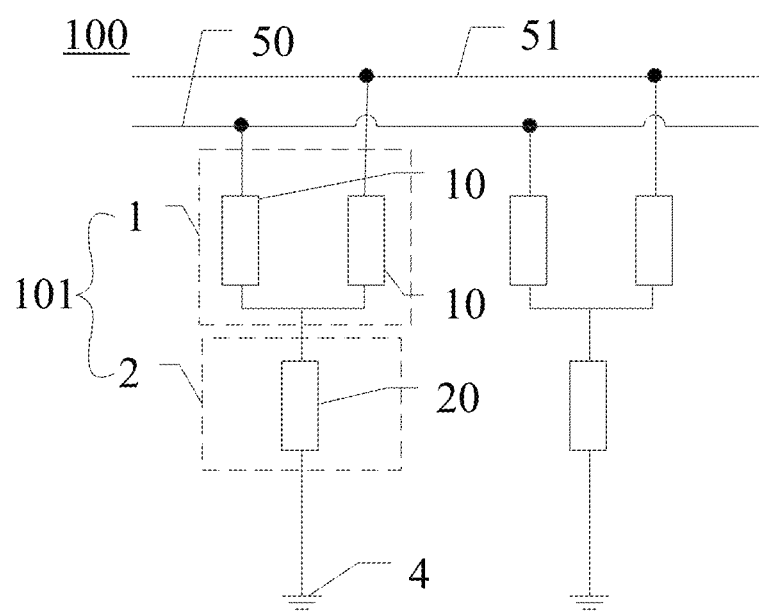
FIG. 6e is a structural schematic diagram of yet another neuron unit of a neural network provided by an embodiment of the present disclosure.

For example, as shown in FIG. 6*c*, in an example, the neuron unit 200 may comprise a first signal line 50, the first signal line 50 is electrically connected with the first group of resistance switching devices 1 or the second group of resistance switching devices 2, correspondingly, a ground line 4 is electrically connected with the second group of resistance switching devices 2 or the first group of resistance switching devices 1. For example, as shown in FIG. 6*d*, in another example, the neuron unit 200 may further comprise a second signal line 51 and a third signal line 52. The first signal line 50, the second signal line 51 and the third signal line 52 are respectively connected with different circuit units 101, so as to provide different voltage signals to the different circuit units 101.

For example, a signal line is correspondingly electrically connected with a resistance gradual-change device in the first group of resistive switching devices or a resistance abrupt-change device in the second group of resistive switching devices. The neuron unit 200, for example, may comprise a plurality of signal lines, and the plurality of signal lines may be electrically connected with a plurality of resistance gradual-change devices 10 in the first group of resistive switching devices 1 in one-to-one correspondence, or the plurality of signal lines may be electrically connected with a plurality of resistance abrupt-change devices 20 in the second group of resistive switching devices 2 in one-to-one correspondence. As shown in FIG. 6*e*, the neuron unit 200 may comprise the first signal line 50 and the second signal line 51, and the first signal line 50 and the second signal line 51 may be electrically connected with two resistance gradual-change devices 10 in the first group of resistive switching devices 1 respectively, that is, the first signal line 50 may be electrically connected with one resistance gradual-change device 10 in the first group of resistive switching devices 1, and the second signal line 51 may be electrically connected with the other resistance gradual-change device 10 in the first group of resistive switching devices 1, so that the first signal line 50 and the second signal line 51 can provide different external applied voltage signals to the two resistance gradual-change devices 10 in the first group of resistive switching devices 1.

For example, as shown in FIG. 6*a*, the neural network further comprises a driver 400. The driver 400 is configured to control the signal lines (such as, the first signal line 50, the second signal line 51 and the third signal line 52) to apply voltage signals to the circuit unit 101.

For example, the driver 400 can be implemented by hardware, software, firmware, and any combination thereof. For example, the driver 400 can be implemented by a computing device such as a CPU, an FPGA, a DSP, or a CMU, or also can be implemented by a CPU and software instructions stored in a memory.

For example, the voltage signal is a positive voltage signal, so that the resistance value of the resistance gradual-change device 10 changes slowly. The positive voltage signal represents that a voltage applied to the first electrode layer of the resistance gradual-change device 10 is greater than a voltage applied to the second electrode layer of the resistance gradual-change device 10.

For example, as shown in FIGS. 6*a* and 6*b*, the neural network further comprises a synapse unit 300. The synapse unit 300 comprises a third group of resistive switching devices 301, so that the neural network may be a full resistive switching device neural network, that is, the neuron unit in the neural network is formed by resistive switching devices as a whole, and the synapse unit in the neural network is also formed by resistive switching devices. In the neural network, the first group of resistive switching devices 1 is used to mimic a dendrite, the second group of resistive switching devices 2 is used to mimic a cell body, and the third group of resistive switching devices 301 is used to mimic a synapse.

For example, the third group of resistive switching devices 301 may comprise a memristor. As shown in FIG. 6*b*, the synapse unit 300 may comprise an n×n synapse array formed by memristors, and signals $x_0, x_1, \ldots, x_n$ pass through the synapse array to form input signals; and then the input signals may be transmitted to the circuit structure 100 of the neuron unit 200; the input signals are processed by the circuit structure 100 and are transmitted to other neuron units through the channels 5.

For example, the third group of resistive switching devices 301 can mimic a plasticity function of a synapse, and the plasticity function of the synapse mainly manifests as excitability and inhibition. When a positive voltage signal is applied to the memristor, the resistance value of the memristor gradually decreases, so that the memristor can simulate an excitatory synapse; when a negative voltage signal is applied to the memristor, the resistance value of the memristor gradually increases, so that the memristor can simulate an inhibitory synapse.

For example, the memristor in the embodiments of the present disclosure may be a metal oxide memristor, such as a memristor formed by titanium dioxide or a memristor formed by a combination of aluminum oxide and titanium dioxide, and the like.

Figure 7:
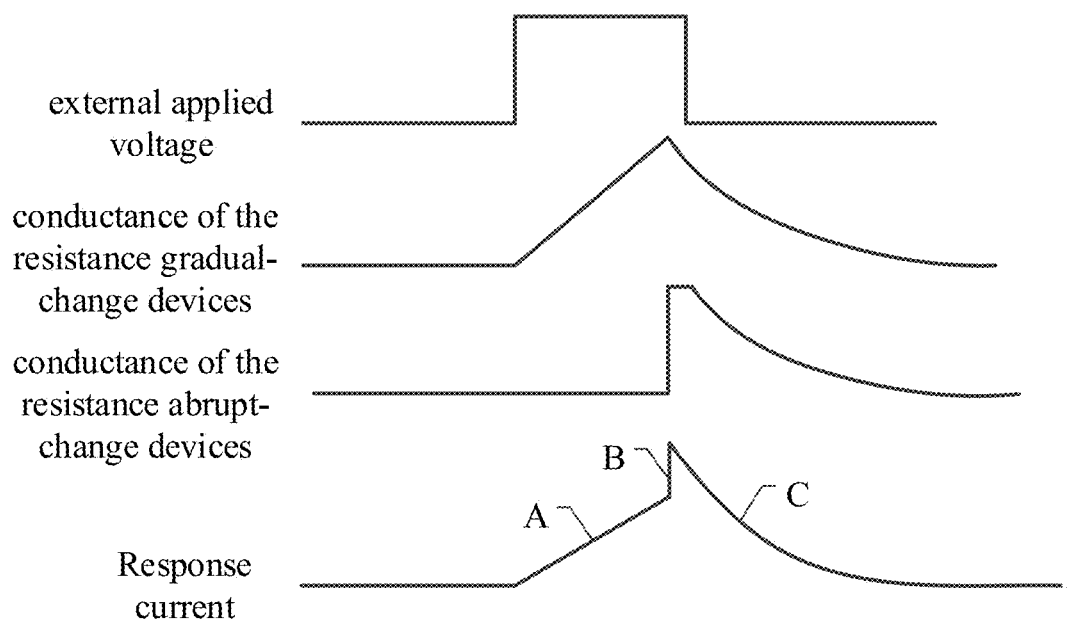
FIG. 7 is a working timing diagram of a driving method provided by an embodiment of the present disclosure.

An embodiment of the present disclosure provides a driving method of the circuit structure described in any one of the above embodiments. FIG. 7 is a working timing diagram of a driving method provided by an embodiment of the present disclosure.

For example, the driving method comprises the following steps: applying a voltage signal to a circuit unit through a signal line under control of a driver to change a resistance value of the first group of resistive switching devices, so as to perform signal integration; and sending a signal when a resistance value of the second group of resistive switching devices abruptly changes.

In the driving method, the voltage signal is applied to the circuit unit to reduce the resistance value of the first group of resistive switching devices, thereby slowly increasing a current in the circuit unit, so that the integration function can be implemented. When the resistance value of the second group of resistive switching devices suddenly decreases, the current in the circuit unit suddenly increases, thus a rising pulse current is generated and then is transmitted, so as to achieve the emission function.

For example, as shown in FIG. 7, an integration stage corresponds to stage A in FIG. 7, at this point, most of the external applied voltage signal is applied to the first group of resistive switching devices, and the resistance value of the resistance gradual-change device in the first group of resistive switching devices gradually decreases, that is, the conductance of the resistance gradual-change device gradually increases, so that the response current in the circuit unit increases slowly; an emission stage corresponds to stage B in FIG. 7, at this point, the external applied voltage signal is transferred to the second group of resistive switching devices, the resistance value of the resistance abrupt-change device in the second group of resistive switching devices abruptly changes, the resistance value of the resistance abrupt-change device abruptly decreases, that is, the conductance of the resistance abrupt-change device suddenly increases, and the response current in the circuit unit suddenly increases, generating a rising pulse current. In summary, the circuit structure can achieve the integrate-and-fire (LIF) function of a neuron.

For example, the driving method further comprises: after the resistance value of the second group of resistive switching devices abruptly changes, turning off the voltage signal to restore the resistance value of the first group of resistive switching devices and the resistance value of the second group of resistive switching devices to an initial state, so as to attenuate the signal.

For example, as shown in FIG. 7, an attenuate stage corresponds to stage in FIG. 7, as this point, the external applied voltage signal is removed, the resistance value of the resistance gradual-change device and the resistance value of the resistance abrupt-change device gradually restore to the initial state, the response current in the circuit unit gradually decreases, so that the circuit structure can achieve an attenuation function of a neuron.

For example, the external applied voltage signal may be a positive voltage signal. During the response time, a voltage value of the external applied voltage signal may remain unchanged; or the voltage value of the external applied voltage signal may also gradually increase. The positive voltage signal represents that a voltage applied to the first electrode layer of the resistance gradual-change device 10 is greater than a voltage applied to the second electrode layer of the resistance gradual-change device 10.

For example, in an example, the driving method may further comprise: applying a voltage signal to a circuit unit through a signal line under control of a driver, when the voltage signal is smaller than a threshold voltage of the first group of resistive switching devices, the resistance values of all the resistance gradual-change devices in the first group of resistive switching devices not changing, and at this point, the response current generated by the circuit unit being small (almost 0 μA), and the circuit unit not transmitting a signal (the signal is the response current); when the voltage signal is greater than the threshold voltage of the first group of resistive switching devices, the resistance values of the resistance gradual-change devices in the first group of resistive switching devices gradually decreasing, at this point, the response current generated by the circuit unit being large, and the circuit unit starting to transmit the signal. That is, a voltage signal that is smaller than the threshold voltage of the first group of resistive switching devices is blocked, so that the circuit unit can achieve a function of filtering the voltage signals. For example, threshold voltages of all the resistance gradual-change devices in the first group of resistive switching devices may be the same, so that a threshold voltage of any one of the resistance gradual-change devices can be the threshold voltage of the first group of resistive switching devices. For another example, the threshold voltages of all the resistance gradual-change devices in the first group of resistive switching devices also may be different, in this case, a threshold voltage of a resistance gradual-change device with the largest initial resistance value may be the threshold voltage of the first group of resistive switching devices. An initial resistance value represents a resistance value of a resistance gradual-change device in a case that the resistance gradual-change device is not applied with a voltage.

For example, as shown in FIG. 3g, when the external applied voltage signal is smaller than a threshold voltage of a resistance gradual-change device, the resistance value of the resistance gradual-change device does not change substantially, and the response current generated by the circuit unit is small; when the external applied voltage signal is greater than the threshold voltage of the resistance gradual-change device, the resistance value of the resistance gradual-change device gradually decreases, the response current generated by the circuit unit is larger, and the response current gradually increases. In summary, the circuit structure may filter the external applied voltage signals that are less than the threshold voltage of the resistance gradual-change device, and the circuit structure can achieve a filtering function of a neuron.

It should be noted that, the first group of resistive switching devices may comprises a plurality of resistance gradual-change devices, the plurality of resistance gradual-change devices, for example, comprise a first resistance gradual-change device and a second resistance gradual-change device, and the first resistance gradual-change device and the second resistance gradual-change device are connected in parallel. If a voltage signal is smaller than a threshold voltage of the first resistance gradual-change device and is greater than a threshold voltage of the second resistance gradual-change device, the voltage signal can be transmitted through the second resistance gradual-change device. That is, according to different voltage signals, the circuit structure can select different resistance gradual-change devices.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

For the present disclosure, the following statements should be noted:

(1) the accompanying drawings involve only the structure(s) in connection with the embodiment(s) of the present disclosure, and other structure(s) can be referred to in common design(s);

(2) for the purpose of clarity only, in accompanying drawings for illustrating the embodiment(s) of the present disclosure, the thickness a layer or area may be enlarged or narrowed, that is, the drawings are not drawn in a real scale;

(3) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A circuit structure, comprising:
at least one circuit unit, wherein each circuit unit comprises a first group of resistive switching devices and a second group of resistive switching devices,
the first group of resistive switching devices comprises a resistance gradual-change device, the second group of resistive switching devices comprises a resistance abrupt-change device, the first group of resistive switching devices and the second group of resistive switching devices are connected in series, and
in a case that no voltage is applied, a resistance value of the first group of resistive switching devices is larger than a resistance value of the second group of resistive switching devices,
wherein the resistance gradual-change device comprises:
a first oxide layer and a second oxide layer, which are laminated together, wherein an oxygen content of the first oxide layer is higher than an oxygen content of the second oxide layer, the oxygen content of the first oxide layer being a molar percentage of oxygen in the first oxide layer, the oxygen content of the second oxide layer being a molar percentage of oxygen in the second oxide layer, and the first oxide layer being in direct physical contact with the second oxide layer, and
a first electrode layer and a second electrode layer, wherein the first oxide layer and the second oxide layer are disposed between the first electrode layer and the second electrode layer, the first electrode layer being in direct physical contact with and electrically connected with the first oxide layer, and the second electrode layer being in direct physical contact with and electrically connected with the second oxide layer,
wherein the resistance gradual-change device has a first resistance value, the resistance abrupt-change device has a second resistance value, and in the case that no voltage is applied, a range of the first resistance value is 1-100 megohms, and a range of the second resistance value is 1-1000 kilohms.

2. The circuit structure according to claim 1, wherein a material of the first oxide layer comprises tantalum pentoxide or aluminum oxide, and a material of the second oxide layer comprises tantalum dioxide.

3. The circuit structure according to claim 1, wherein a material of the first electrode layer comprises an active metal.

4. The circuit structure according to claim 1, wherein the resistance abrupt-change device comprises a third electrode layer, a third oxide layer and a fourth electrode layer,
the third electrode layer, the third oxide layer and the fourth electrode layer are laminated together, and the third oxide layer is disposed between the third electrode layer and the fourth electrode layer.

5. The circuit structure according to claim 4, wherein a material of the third oxide layer comprises tantalum pentoxide, vanadium oxide, or niobium oxide.

6. The circuit structure according to claim 4, wherein a material of the third electrode layer comprises an inert metal.

7. The circuit structure according to claim 1, wherein the first group of resistive switching devices comprises a plurality of resistance gradual-change devices, the second group of resistive switching devices comprises a plurality of resistance abrupt-change devices, and the plurality of resistance gradual-change devices are connected in series with the plurality of resistance abrupt-change devices in one-to-one correspondence.

8. The circuit structure according to claim 1, wherein the first group of resistive switching devices comprises a plurality of resistance gradual-change devices, the second group of resistive switching devices comprises one resistance abrupt-change device, and the plurality of resistance gradual-change devices correspond to the one resistance abrupt-change device and are respectively connected in series with the one resistance abrupt-change device.

9. The circuit structure according to claim 8, wherein in the case that no voltage is applied, resistance values of at least two resistance gradual-change devices are different.

10. The circuit structure according to claim 8, wherein at least two resistance gradual-change devices are connected in parallel.

11. The circuit structure according to claim 1, wherein the first group of resistive switching devices comprises one resistance gradual-change device, the second group of resistive switching devices comprises a plurality of resistance abrupt-change devices, and the one resistance gradual-change device corresponds to the plurality of resistance abrupt-change devices and is connected in series with the plurality of resistance abrupt-change devices respectively.

12. A neural network, comprising a neuron unit,
wherein the neuron unit comprises a circuit structure, the circuit structure comprises:
at least one circuit unit, wherein each circuit unit comprises a first group of resistive switching devices and a second group of resistive switching devices,
the first group of resistive switching devices comprises a resistance gradual-change device, the second group of resistive switching devices comprises a resistance abrupt-change device, the first group of resistive switching devices and the second group of resistive switching devices are connected in series, and
in a case that no voltage is applied, a resistance value of the first group of resistive switching devices is larger than a resistance value of the second group of resistive switching devices,
wherein the resistance gradual-change device comprises:
a first oxide layer and a second oxide layer, which are laminated together, wherein an oxygen content of the first oxide layer is higher than an oxygen content of the second oxide layer, the oxygen content of the first oxide layer being a molar percentage of oxygen in the first oxide layer, the oxygen content of the second oxide layer being a molar percentage of oxygen in the second oxide layer, the first oxide layer being in direct physical contact with the second oxide layer, and a first electrode layer and a second electrode layer, wherein the first oxide layer and the second oxide layer are disposed between the first electrode layer and the second electrode layer, the first electrode layer being in direct physical contact with and electrically connected with the first oxide layer, and the second electrode layer being in direct physical contact with and electrically connected with the second oxide layer, wherein the resistance gradual-change device has a first resistance value, the resistance abrupt-change device has a second resistance value, and in the case that no voltage is applied, a range of the first resistance value is 1-100 megohms, and a range of the second resistance value is 1-1000 kilohms.

13. The neural network according to claim 12, wherein the neuron unit further comprises at least one signal line, and the at least one signal line is electrically connected with one of the first group of resistive switching devices and the second group of resistive switching devices.

14. The neural network according to claim 12, further comprising: a driver, wherein the driver is configured to apply a voltage signal to a circuit unit through a signal line.

15. The neural network according to claim 12, further comprising a synapse unit, wherein the synapse unit comprises a third group of resistive switching devices, and the third group of resistive switching devices comprises a memristor.

16. A driving method of a circuit structure, wherein the circuit structure comprises:

at least one circuit unit, wherein each circuit unit comprises a first group of resistive switching devices and a second group of resistive switching devices, the first group of resistive switching devices comprises a resistance gradual-change device, the second group of resistive switching devices comprises a resistance abrupt-change device, the first group of resistive switching devices and the second group of resistive switching devices are connected in series, and in a case that no voltage is applied, a resistance value of the first group of resistive switching devices is larger than a resistance value of the second group of resistive switching devices, wherein the resistance gradual-change device comprises:

a first oxide layer and a second oxide layer, which are laminated together, wherein an oxygen content of the first oxide layer is higher than an oxygen content of the second oxide layer, the oxygen content of the first oxide layer being a molar percentage of oxygen in the first oxide layer, the oxygen content of the second oxide layer being a molar percentage of oxygen in the second oxide layer, the first oxide layer being in direct physical contact with the second oxide layer, and a first electrode layer and a second electrode layer, wherein the first oxide layer and the second oxide layer are disposed between the first electrode layer and the second electrode layer, the first electrode layer being in direct physical contact with and electrically connected with the first oxide layer, and the second electrode layer being in direct physical contact with and electrically connected with the second oxide layer, wherein the resistance gradual-change device has a first resistance value, the resistance abrupt-change device has a second resistance value, and in the case that no voltage is applied, a range of the first resistance value is 1-100 megohms, and a range of the second resistance value is 1-1000 kilohms, the driving method comprises:

applying a voltage signal to a circuit unit through a signal line to change a resistance value of the first group of resistive switching devices, so as to perform signal integration; and sending a signal when a resistance value of the second group of resistive switching devices abruptly changes.

17. The driving method according to claim 16, further comprises:

after the resistance value of the second group of resistive switching devices abruptly changes, turning off the voltage signal to restore the resistance value of the first group of resistive switching devices and the resistance value of the second group of resistive switching devices to an initial state, so as to attenuate the signal.

* * * * *